US00RE47204E

(19) United States
(12) Reissued Patent
Ueda et al.

(10) Patent Number: US RE47,204 E
(45) Date of Reissued Patent: Jan. 15, 2019

(54) ZOOM LENS AND IMAGE PICKUP APPARATUS EQUIPPED WITH SAME

(71) Applicant: OLYMPUS CORPORATION, Tokyo (JP)

(72) Inventors: Minoru Ueda, Kanagawa (JP); Masahito Watanabe, Tokyo (JP); Masahiro Imamura, Tokyo (JP); Mayu Miki, Tokyo (JP)

(73) Assignee: OLYMPUS CORPORATION, Tokyo (JP)

(21) Appl. No.: 15/077,159

(22) Filed: Mar. 22, 2016

Related U.S. Patent Documents

Reissue of:
(64) Patent No.: 8,872,960
Issued: Oct. 28, 2014
Appl. No.: 13/761,768
Filed: Feb. 7, 2013

(30) Foreign Application Priority Data

Feb. 7, 2012 (JP) ..... 2012-023896
Jan. 8, 2013 (JP) ..... 2013-001056

(51) Int. Cl.
*G02B 13/00* (2006.01)
*G02B 13/04* (2006.01)

(52) U.S. Cl.
CPC ..... *G02B 13/009* (2013.01); *G02B 13/04* (2013.01)

(58) Field of Classification Search
CPC ..... G02B 15/14
USPC ..... 348/345; 359/689
See application file for complete search history.

(56) References Cited

U.S. PATENT DOCUMENTS 5,715,088 A * 2/1998 Suzuki ..... G02B 15/173 359/554
6,710,934 B2 * 3/2004 Park ..... G02B 15/177 359/683
7,289,275 B2 * 10/2007 Ito ..... 359/689
2006/0170815 A1 * 8/2006 Watanabe et al. ..... 348/357
2009/0103186 A1 * 4/2009 Hankawa ..... G02B 15/177 359/686
2010/0328500 A1 12/2010 Yoshitsugu et al.
2011/0157715 A1 * 6/2011 Ito ..... G02B 15/177 359/682
2011/0273774 A1 * 11/2011 Saruwatari ..... G02B 9/34 359/554

(Continued)

FOREIGN PATENT DOCUMENTS

JP 2010-145587 7/2010
JP 2011-064933 3/2011

*Primary Examiner* — Peng Ke
(74) *Attorney, Agent, or Firm* — Hunton Andrews Kurth LLP

(57) ABSTRACT

A zoom lens includes, in order from the object side, a first lens unit having a negative refractive power, a second lens unit having a positive refractive power, and a third lens unit having a positive refractive power. The first lens unit includes a negative lens and a positive lens. The zoom lens satisfies the following conditional expression (1):

$$\Sigma d_{13}/f_t<0.4 \quad (1)$$

where $\Sigma d_13$ is the total sum of the thickness of the lenses included in the first to third lens units of the zoom lens on the optical axis, and $f_t$ is the focal length of the entire zoom lens system at the telephoto end.

7 Claims, 15 Drawing Sheets

(56) References Cited

U.S. PATENT DOCUMENTS

| | | | | |
|---|---|---|---|---|
| 2012/0013992 | A1* | 1/2012 | Yamasaki | G02B 15/177 359/684 |
| 2012/0105973 | A1 | 5/2012 | Peng et al. | |
| 2012/0162776 | A1* | 6/2012 | Nanba | G02B 15/177 359/682 |

* cited by examiner 486.13
656.27
587.56

ZOOM LENS AND IMAGE PICKUP APPARATUS EQUIPPED WITH SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

The present application is based upon and claims the benefit of priority from the prior Japanese Patent Application No. 2012-023896 filed on Feb. 7, 2012 and Japanese Patent Application No. 2013-1056 filed on Jan. 8, 2013; the entire contents of which are incorporated herein by reference.

BACKGROUND OF THE INVENTION

1. Field of the Invention

The present invention relates a zoom lens and an image pickup apparatus equipped with the same.

2. Description of the Related Art

In recent years, digital cameras that pick up an image of an object using a solid state image pickup element such as a CCD or CMOS have replaced film cameras and become the mainstream. Furthermore, various categories of digital cameras ranging from popular-priced compact type cameras to function-rich cameras for professionals have been developed.

Users of popular-priced digital cameras wish to enjoy easy shooting in various shooting situations anywhere at any time. For this reason, such users favor small size digital cameras, especially slim digital cameras that can be conveniently carried in a pocket of clothes or a bag. Therefore, a further reduction in the size of the taking lens system is demanded.

Moreover, while a wide angle of view is demanded in terms of the zoom range, image pickup apparatuses equipped with a zoom lens having a configuration that can be manufactured at low cost while having high optical performance with a zoom ratio higher than five are demanded.

As a zoom lens having a high zoom ratio and a relatively wide angle of view while being composed of a small number of lenses, there has been known a prior art zoom lens including, in order from the object side, a first lens unit having a negative refractive power, a second lens unit having a positive refractive power, and a third lens unit having a positive refractive power (see Japanese Patent Application Laid-open Nos. 2010-145587 and 2011-64933).

The optical systems disclosed in Japanese Patent Application Laid-open Nos. 2010-145587 and 2011-64933 have a zoom ratio of about 4.8 while having a wide angle of view. In an optical system according to an embodiment disclosed in Japanese Patent Application Laid-open No. 2010-145587 and an optical system according to an embodiment (embodiment 1) disclosed in Japanese Patent Application Laid-open No. 2011-64933, the third lens unit is composed on only one single lens, so that the number of lenses in the optical system is small.

SUMMARY OF THE INVENTION

A zoom lens according to the present invention comprises, in order from the object side:

a first lens unit having a negative refractive power;

a second lens unit having a positive refractive power; and a third lens unit having a positive refractive power, wherein the first lens unit comprises a negative lens and a positive lens, and the zoom lens satisfies the following conditional expression (1):

$$\Sigma d_{13}/f_t<0.4 \quad (1)$$

where $\Sigma d_{13}$ is the total sum of the thickness of the lenses included in the first to third lens units of the zoom lens on the optical axis, and $f_t$ is the focal length of the entire zoom lens system at the telephoto end.

An image pickup apparatus according to the present invention comprises:

the above-described zoom lens; and an image pickup element disposed on the image side of the zoom lens and having an image pickup surface that receives an image formed by the zoom lens.

BRIEF DESCRIPTION OF THE DRAWINGS

FIG. 1A shows the state at the wide angle end, FIG. 1B shows the state in an intermediate focal length state, and FIG. 1C shows the state at the telephoto end;

FIG. 2A shows the state at the wide angle end, FIG. 2B shows the state in an intermediate focal length state, and FIG. 2C shows the state at the telephoto end;

FIG. 3A shows the state at the wide angle end, FIG. 3B shows the state in an intermediate focal length state, and FIG. 3C shows the state at the telephoto end;

FIG. 4A shows the state at the wide angle end, FIG. 4B shows the state in an intermediate focal length state, and FIG. 4C shows the state at the telephoto end;

FIG. 5A shows the state at the wide angle end, FIG. 5B shows the state in an intermediate focal length state, and FIG. 5C shows the state at the telephoto end;

FIGS. 10A, 10B, 10C, 10D, 10E, 10F, 10G, 10H, 101, 10J, 10K, and 10L are aberration diagrams of the zoom lens according to the fifth embodiment in the state in which the zoom lens is focused on an object point at infinity;

DETAILED DESCRIPTION OF THE INVENTION

Figure 1A:
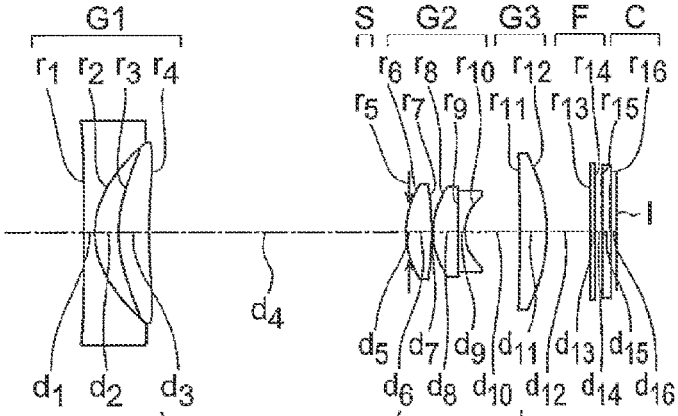
FIGS. 1A, 1B, and 1C are cross sectional views taken along the optical axis, showing the construction of a zoom lens according to a first embodiment of the present invention in the state in which the zoom lens is focused on an object point at infinity, where

In the following, embodiments of the zoom lens and the image pickup apparatus equipped with the same according to the present invention will be described in detail with reference to the drawings. It should be understood that the present invention is not limited by the embodiments.

Prior to the description of the embodiments, the operation and advantages of a taking optical system according to a mode of the invention will be described.

A zoom lens according to a mode of the present invention comprises, in order from the object side:

a first lens unit having a negative refractive power;

a second lens unit having a positive refractive power; and a third lens unit having a positive refractive power, wherein the first lens unit comprises a negative lens and a positive lens, and the zoom lens satisfies the following conditional expression (1):

$$\Sigma d_{13}/f_t<0.4 \quad (1)$$

where $\Sigma d_{13}$ is the total sum of the thickness of the lenses included in the first to third lens units of the zoom lens on the optical axis, and $f_t$ is the focal length of the entire zoom lens system at the telephoto end.

The lens unit closest to the object side is a negative lens unit, and the lens unit subsequent to it is a positive lens. Thus, the zoom lens has a retro-focus configuration. Therefore, the zoom lens can have a somewhat large back focus while having a large angle of view.

The retro-focus configuration improves the telecentricity, and therefore the zoom lens is suitable for use with an electronic image pickup element such as a CCD or CMOS sensor. The first lens unit includes two lenses, which are a negative lens and a positive lens. Thus, the first lens unit has a compact configuration, eliminating a useless space.

Conditional expression (1) is a condition concerning the total sum of the thickness of the lenses included in the first to third lens units of the zoom lens on the optical axis normalized by the focal length $f_t$ of the entire zoom lens system at the telephoto end.

If the upper limit of conditional expression (1) is exceeded, the total sum of the lens thickness becomes large and the size of the entire zoom lens system becomes large during the zooming operation and in the collapsed state. Then, it will be difficult to make the overall length of the zoom lens small during the zooming operation and in the collapsed state.

If the upper limit of conditional expression (1) is exceeded, the position of the entrance pupil becomes distant. Then, the first lens unit is necessitated to be large, and it will be difficult to make the zoom lens compact.

It is preferred that the zoom lens according to the present invention satisfy the following conditional expression (5):

$$\Sigma d/f_t<0.45 \quad (2)$$

where $\Sigma d$ is the total sum of the thickness of all the lenses included in the zoom lens on the optical axis.

Conditional expression (2) is a condition concerning the total sum of the thickness of all the lenses included in the zoom lens on the optical axis normalized by the focal length $f_t$ of the entire zoom lens system at the telephoto end.

If the upper limit of conditional expression (2) is exceeded, the total sum of the lens thickness becomes large and the size of the entire zoom lens system becomes large during the zooming operation and in the collapsed state. Then, it will be difficult to make the overall length of the zoom lens small during the zooming operation and in the collapsed state.

If the upper limit of conditional expression (2) is exceeded, the position of the entrance pupil becomes distant. Then, the first lens unit is necessitated to be large, and it will be difficult to make the zoom lens compact.

In the zoom lens according to the present invention, it is preferred that the first lens unit and the second lens unit move in such away as to vary the relative distance between the first lens unit and the second lens unit during zooming and that the zoom lens satisfy the following conditional expressions (3) and (4):

$$f_1/f_w<-2.5 \quad (3), \text{ and}$$

$$|m_{2G}|/f_w>4.6 \quad (4),$$

where $f_1$ is the focal length of the first lens unit, $f_w$ is the focal length of the entire zoom lens system at the wide angle end, and $m_{2G}$ is the amount of shift of the second lens unit on the optical axis during zooming from the wide angle end to the telephoto end.

Conditional expression (3) limits the refractive power of the negative lens in the first lens unit. Specifically, it limits the range of the focal length of the first lens unit normalized by the focal length of the entire zoom lens system at the wide angle end.

If the upper limit of conditional expression (3) is exceeded, the negative refractive power of the first lens unit becomes so high that it is difficult to correct aberrations generated in the first lens unit, in particular chromatic aberration.

The first lens unit is only one negative lens unit in the zoom lens. If the refractive power of the first lens unit is too high, it is impossible to make the Petzval sum small.

Conditional expression (4) limits the amount of shift of the second lens unit.

If the lower limit of conditional expression (4) is not reached, the magnification changing effect that the second lens unit provides becomes small. Then, it will be difficult to achieve a high zoom ratio.

To achieve a high zoom ratio, the other lens units need to provide large magnification changes, leading to large aberrations generated in these lens units that are difficult to correct.

If conditional expression (3) and (4) are both satisfied, it is possible to achieve a high zoom ratio with small aberrations.

It is also preferred that the zoom lens according to the present invention satisfy the following conditional expressions (5), (6), (7), and (8):

$$1.70<n_{1nd}<1.80 \quad (5)$$

$$50<\nu_{1nd}<60 \quad (6)$$

$$1.60<n_{1pd}<1.70 \quad (7), \text{ and}$$

$$20<\nu_{1pd}<30 \quad (8),$$

where $n_{1nd}$ is the refractive index of the negative lens in the first lens unit with respect to the d-line, $\nu_{1nd}$ is the Abbe constant $(n_{1nd}-1)/(n_{F1}-n_{C1})$ of the negative lens in the first lens unit with respect to the d-line, $n_{C1}$ is the refractive index of the negative lens in the first lens unit with respect to the C-line, $n_{F1}$ is the refractive index of the negative lens in the first lens unit with respect to the F-line, $n_{1pd}$ is the refractive index of the positive lens in the first lens unit with respect to the d-line, $\nu_{1pd}$ is the Abbe constant $(n_{1pd}-1)/(n_{F2}-n_{c2})$ of the positive lens in the first lens unit with respect to the d-line, $n_{c2}$ is the refractive index of the positive lens in the first lens unit with respect to the C-line, and $n_{F2}$ is the refractive index of the positive lens in the first lens unit with respect to the F-line.

Conditional expressions (5) and (6) are conditions concerning the refractive index and the Abbe constant of the negative lens in the first lens unit, introduced to make aberration variation small while providing the first lens unit with an adequate refractive power.

If the lower limit of conditional expression (5) is not reached, the refractive power of the first lens unit having a negative refractive power becomes so small that it is impossible to achieve an appropriately high zoom ratio or that the overall length of the zoom lens becomes large, making it impossible to make the zoom lens compact. Moreover, if the refractive index of the negative lens is low, the Petzval sum of the optical system cannot be made small.

If the upper limit of conditional expression (5) is exceeded, it is impossible to make the value of the Abbe constant fall within an appropriate range, leading to large chromatic aberration generated in the first lens unit, which makes aberration correction difficult.

If the lower limit of conditional expression (6) is not reached, large chromatic aberration is generated, which makes aberration correction difficult.

If the upper limit of conditional expression (6) is exceeded, it is impossible to make the refractive index of the negative lens high, and therefore the first lens unit cannot have a high refractive power. Then, it is impossible to achieve an appropriately high zoom ratio, or the overall length of the zoom lens becomes large, making it impossible to make the zoom lens compact.

Conditional expressions (7) and (8) are conditions concerning the refractive index and the Abbe constant of the positive lens in the first lens unit, introduced to make aberration variation small while providing the first lens unit with an adequate refractive power.

If the lower limit of conditional expression (7) is not reached, it is impossible to make the value of the Abbe constant fall within an appropriate range, leading to large chromatic aberration generated in the first lens unit, which makes aberration correction difficult.

If the upper limit of the conditional expression (7) is exceeded, the negative refractive power of the first lens unit having a negative refractive power becomes so small that it is impossible to achieve an appropriately high zoom ratio or that the overall length of the zoom lens becomes large, making it impossible to make the zoom lens compact.

If the lower limit of conditional expression (8) is not reached, the first lens unit cannot have a high refractive power. Then, it is impossible to achieve an appropriately high zoom ratio, or the overall length of the zoom lens becomes large, making it impossible to make the zoom lens compact.

If the upper limit of conditional expression (8) is exceeded, large chromatic aberration is generated, which makes aberration correction difficult.

If the positive and negative lenses in the first lens unit satisfy all of conditional expressions (5), (6), (7), and (8) described above, aberrations generated in the first lens unit, in particular chromatic aberration, can be corrected excellently.

It is preferred that the zoom lens according to the present invention satisfy the following conditional expressions (3a), (9), and (10):

$$-3.0<f_1/f_w<-2.5 \quad (3a),$$

$$2.05<f_2/f_w<2.20 \quad (9), \text{ and}$$

$$3.9<f_3/f_w<5.2 \quad (10),$$

where $f_2$ is the focal length of the second lens unit, and $f_3$ is the focal length of the third lens unit.

Conditional expression (3a) is a condition concerning the refractive power of the negative lens in the first lens unit. Specifically, it limits the range of the focal length of the first lens unit normalized by the focal length of the entire zoom lens system at the wide angle end.

If the upper limit of conditional expression (3a) is exceeded, the negative refractive power of the first lens unit becomes so high that large curvature of field will be generated at the wide angle end.

If the lower limit of conditional expression (3a) is not reached, the negative refractive power of the first lens unit becomes so low that it will be difficult to make the zoom ratio of the zoom lens system high or that the overall length of the zoom lens will become large, making it difficult to achieve compactness.

Conditional expression (9) is a condition concerning the refractive power of the positive lens in the second lens unit. Specifically, it limits the range of the focal length of the second lens unit normalized by the focal length of the entire zoom lens system at the wide angle end.

If the lower limit of conditional expression (9) is not reached, the positive refractive power of the second lens unit becomes so high that large spherical aberration and coma will be generated.

If the upper limit of conditional expression (9) is exceeded, the positive refractive power of the second lens unit becomes so low that it will be difficult to make the zoom ratio of the zoom lens system high or that the overall length of the zoom lens will become large, making it difficult to achieve compactness.

Conditional expression (10) is a condition concerning the refractive power of the positive lens in the third lens unit. Specifically, it limits the range of the focal length of the third lens unit normalized by the focal length of the entire zoom lens system at the wide angle end.

If the lower limit of conditional expression (10) is not reached, the positive refractive power of the third lens unit becomes so high that large curvature of field will be generated at the telephoto end.

If the upper limit of conditional expression (10) is exceeded, the positive refractive power of the third lens unit becomes so low that it will be difficult to make the zoom ratio of the zoom lens system high or that the overall length of the zoom lens will become large, making it difficult to achieve compactness.

By designing the zoom lens in such a way as to satisfy the above conditional expressions (3a), (9), and (10), the zoom lens will be well balanced in terms of that the second lens unit provides a high magnification changing effect, that aberration variations due to manufacturing errors can be made small, and that the focusing sensitivity in performing focusing by the third lens unit can be set appropriately.

Furthermore, it is possible to make the collapsed thickness of the zoom lens can be made small while making the overall length thereof short.

In the zoom lens according to the present invention, it is preferred that the negative lens in the first lens unit be a biconcave lens, that the first lens unit and the second lens unit move in such a way as to vary the distance between the first lens unit and the second lens unit, and that the following conditional expression (11) be satisfied:

$$d_{1m}/I_h<0.2 \quad (11),$$

where $d_{1m}$ is the thickness of the negative lens in the first lens unit on the optical axis, and $I_h$ is the largest image height of the zoom lens on an image pickup surface.

Using a biconcave lens as the negative lens in the first lens unit allows to make the negative refractive power of the first lens unit high with efficient space usage.

Conditional expression (11) limits the range of the thickness of the negative lens in the first lens unit normalized by the largest image height on the image pickup surface.

If the upper limit of conditional expression (11) is exceeded, the thickness of the negative lens in the first lens unit becomes so large that the first lens unit cannot be made compact. This is undesirable.

It is preferred that the zoom lens according to the present invention satisfy the following conditional expression (12):

$$f_t/f_w>4.5 \quad (12)$$

The image pickup apparatus according to the present invention includes the above-described zoom lens and an image pickup element disposed on the image side of the zoom lens and having an image pickup surface that receives an image formed by the zoom lens.

It is more preferred that the conditional expressions described in the foregoing be further limited as follows.

It is more preferred that the upper limit value in conditional expression (1) be 0.39.

It is more preferred that the upper limit value in conditional expression (2) be 0.43.

It is more preferred that the lower limit value in conditional expression (3) be −2.7.

It is more preferred that the upper limit value in conditional expression (4) be 5.2.

It is more preferred that the upper limit value in conditional expression (6) be 55.

It is more preferred that the upper limit value in conditional expression (7) be 1.65.

It is more preferred that the upper limit value in conditional expression (8) be 25.

It is more preferred that the lower limit value in conditional expression (3a) be −2.7.

It is more preferred that the lower limit value in conditional expression (10) be 4.5.

It is more preferred that the upper limit value in conditional expression (10) be 5.

It is more preferred that the lower limit value in conditional expression (11) be 0.1.

It is more preferred that the upper limit value in conditional expression (11) be 0.15.

In the further limitation of the numerical range of the conditional expressions mentioned above, the further limitation may be made only to the upper limit value or the lower limit value.

[Embodiments]

In the following, first to fifth embodiments of the zoom lens of the present invention will be described. FIGS. 1A, 2A, 3A, 4A, and 5A are cross sectional views of the zoom lenses according to the first to fifth embodiments in the state in which the zoom lenses are focused on an object point at infinity at the wide angle end. FIGS. 1B, 2B, 3B, 4B, and 5B are cross sectional views of the zoom lenses according to the first to fifth embodiments in the state in which the zoom lenses are focused on an object point at infinity in an intermediate focal length state. FIGS. 1C, 2C, 3C, 4C, and 5C are cross sectional views of the zoom lenses according to the first to fifth embodiments in the state in which the zoom lenses are focused on an object point at infinity at the telephoto end. In FIGS. 1A to 5A, 1B to 5B, and 1C to 5C, a first lens unit is denoted by G1, a second lens unit is denoted by G2, a third lens unit is denoted by G3, a fourth lens unit is denoted by G4, an aperture stop is denoted by S, a plane parallel plate constituting a low pass filter on which wavelength restriction coating for blocking or reducing infrared is applied is denoted by F, a plane parallel plate constituting a cover glass for an electronic image pickup element is denoted by C, and the image plane is denoted by I. A multi-layer coating for wavelength restriction may be applied to the surface of the cover glass C. The cover glass C may have a low pass filtering function. The low pass filter function of the plane parallel plate F may be eliminated.

All the numerical data of the embodiment presented below are for the state in which the zoom lenses are focused on an object at infinity. In the numerical data, dimensions are in millimeters and angles are in degrees. Zoom data will be given for the wide angle end, for the intermediate focal length state, and for the telephoto end.

Figure 1B:
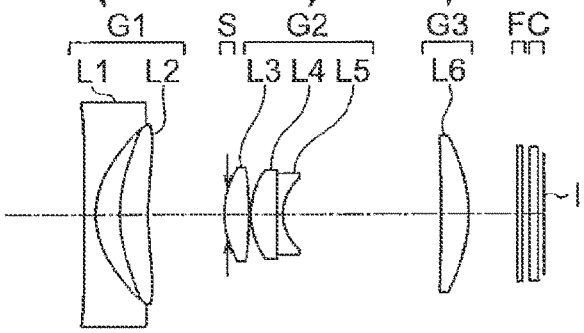
Figure 1C:
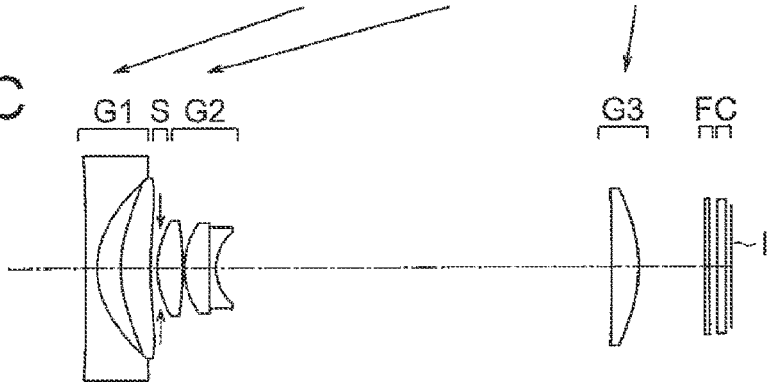

As shown in FIGS. 1A, 1B, and 1C, the zoom lens according to the first embodiment includes, in order from the object side, a first lens unit G1 having a negative refractive power, an aperture stop S, a second lens unit G2 having a positive refractive power, and a third lens unit G3 having a positive refractive power.

During zooming from the wide angle end to the telephoto end, the first lens unit G1 moves first toward the image side and thereafter toward the object side, the second lens unit G2 moves toward the object side, and the third lens unit G3 moves toward the object side. The aperture stop S moves with the second lens unit G2.

Focusing operation is performed by moving the third lens unit G3. For focusing from an object at long distance to an object at a short distance, the third lens unit G3 is moved toward the object side. Alternatively, all of the first to third lens units G1, G2, and G3 may be moved toward the object side for focusing.

The first lens unit G1 is composed of a biconcave negative lens L1 and a positive meniscus lens L2 having a convex surface directed toward the object side. The second lens unit G2 is composed of a biconvex positive lens L3 and a cemented lens made up of a plano-convex positive lens L4 and a plano-concave negative lens L5. The third lens unit G3 is composed of a positive meniscus lens L6 having a convex surface directed toward the image side. The lens elements in each lens unit are arranged in the mentioned order from the object side.

There are seven aspheric surfaces, which include both surfaces of the biconcave negative lens L1 in the first lens unit G1, both surfaces of the positive meniscus lens L2 in the first lens unit G1, both surfaces of the biconvex positive lens L3 in the second lens unit G2, and the image side surface of the positive meniscus lens L6 in the third lens unit G3.

The aperture stop S is located closer to the image side than the surface vertex of the object side surface of the biconvex positive lens L3. In FIGS. 1A, 1B, and 1C, it may be difficult to understand what distances d4 and d5 mean, because the position of the aperture stop S on the optical axis is not indicated. Distance d4 is the distance from the surface vertex of the image side surface of the positive meniscus lens L2 through the surface vertex of the object side surface of the biconvex positive lens L3 to the position (not shown) of the aperture stop S on the optical axis. Distance d4 has a positive value. Distance d5 is the distance from the position (not shown) of the aperture stop S on the optical axis to the surface vertex of the object side surface of the biconvex positive lens L3. Distance d5 has a negative value. This explanation of distances d4 and d5 also applies to the second to fifth embodiments.

Figure 2A:
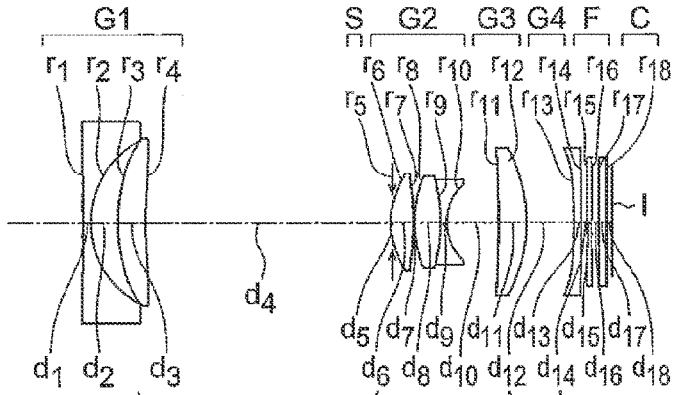
FIGS. 2A, 2B, and 2C are cross sectional views taken along the optical axis, showing the construction of a zoom lens according to a second embodiment of the present invention in the state in which the zoom lens is focused on an object point at infinity, where
Figure 2B:
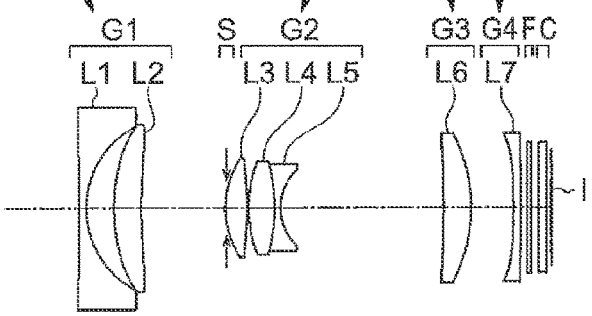
Figure 2C:
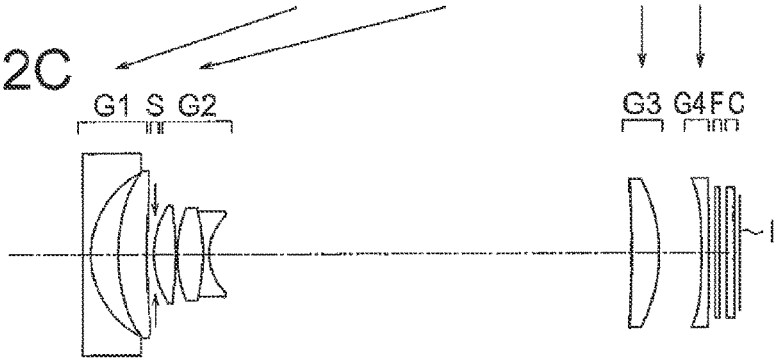

As shown in FIGS. 2A, 2B, and 2C, the zoom lens according to the second embodiment includes, in order from the object side, a first lens unit G1 having a negative refractive power, an aperture stop S, a second lens unit G2 having a positive refractive power, a third lens unit G3 having a positive refractive power, and a fourth lens unit G4 having a negative refractive power.

During zooming from the wide angle end to the telephoto end, the first lens unit G1 moves first toward the image side and thereafter toward the object side, the second lens unit G2 moves toward the object side, the third lens unit G3 moves toward the image side. The fourth lens unit G4 is fixed. The aperture stop S moves with the second lens unit G2.

Focusing operation is performed by moving the third lens unit G3. For focusing from an object at long distance to an object at a short distance, the third lens unit G3 is moved toward the object side.

The first lens unit G1 is composed of a biconcave negative lens L1 and a positive meniscus lens L2 having a convex surface directed toward the object side. The second lens unit G2 is composed of a biconvex positive lens L3 and a cemented lens made up of a biconvex positive lens L4 and a biconcave negative lens L5. The third lens unit G3 is composed of a positive meniscus lens L6 having a convex surface directed toward the image side. The fourth lens unit G4 is composed of a negative meniscus lens L7 having a convex surface directed toward to the image side. The lens elements in each lens unit are arranged in the mentioned order from the object side.

There are six aspheric surfaces, which include both surfaces of the positive meniscus lens L2 in the first lens unit G1, both surfaces of the biconvex positive lens L3 in the second lens unit G2, the image side surface of the positive meniscus lens L6 in the third lens unit G3, and the object side surface of the negative meniscus lens L7 in the fourth lens unit G4.

Figure 3A:
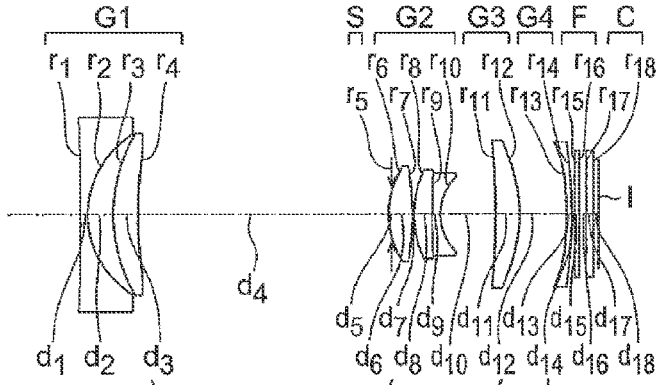
FIGS. 3A, 3B, and 3C are cross sectional views taken along the optical axis, showing the construction of a zoom lens according to a third embodiment of the present invention in the state in which the zoom lens is focused on an object point at infinity, where
Figure 3B:
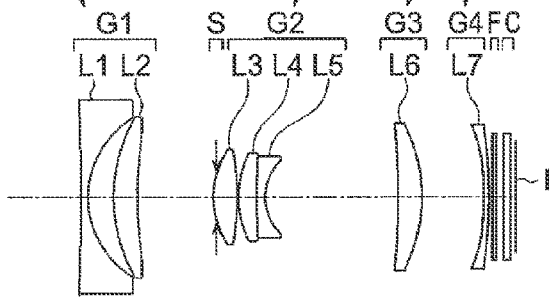
Figure 3C:
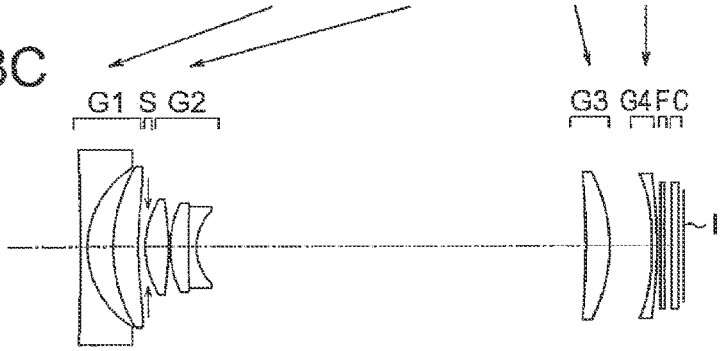

As shown in FIGS. 3A, 3B, and 3C, the zoom lens according to the third embodiment includes, in order from the object side, a first lens unit G1 having a negative refractive power, an aperture stop S, a second lens unit G2 having a positive refractive power, a third lens unit G3 having a positive refractive power, and a fourth lens unit G4 having a positive refractive power.

During zooming from the wide angle end to the telephoto end, the first lens unit G1 moves first toward the image side and thereafter toward the object side, the second lens unit G2 moves toward the object side, and the third lens unit G3 first moves toward the object side and thereafter toward the image side. The fourth lens unit G4 is fixed. The aperture stop S moves with the second lens unit G2.

Focusing operation is performed by moving the third lens unit G3. For focusing from an object at long distance to an object at a short distance, the third lens unit G3 is moved toward the object side.

The first lens unit G1 is composed of a biconcave negative lens L1 and a positive meniscus lens L2 having a convex surface directed toward the object side. The second lens unit G2 is composed of a biconvex positive lens L3 and a cemented lens made up of a positive meniscus lens L4 having a convex surface directed toward the object side and a negative meniscus lens L5 having a convex surface directed toward the object side. The third lens unit G3 is composed of a positive meniscus lens L6 having a convex surface directed toward the image side. The fourth lens unit G4 is composed of a positive meniscus lens L7 having a convex surface directed toward to the image side. The lens elements in each lens unit are arranged in the mentioned order from the object side.

There are six aspheric surfaces, which include both surfaces of the positive meniscus lens L2 in the first lens unit G1, both surfaces of the biconvex positive lens L3 in the second lens unit G2, the image side surface of the positive meniscus lens L6 in the third lens unit G3, and the object side surface of the positive meniscus lens L7 in the fourth lens unit G4.

Figure 4A:
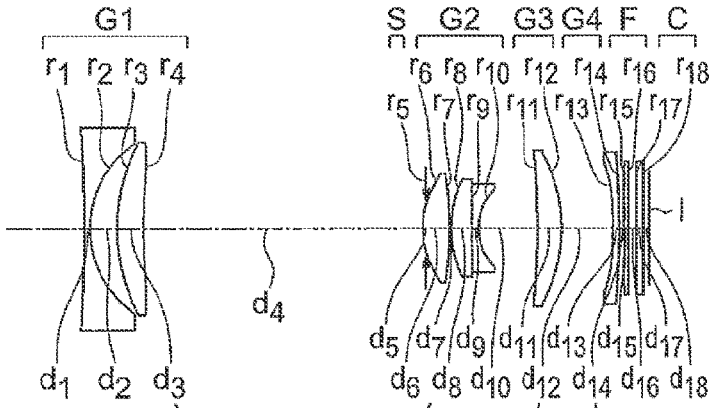
FIGS. 4A, 4B, and 4C are cross sectional views taken along the optical axis, showing the construction of a zoom lens according to a fourth embodiment of the present invention in the state in which the zoom lens is focused on an object point at infinity, where
Figure 4B:
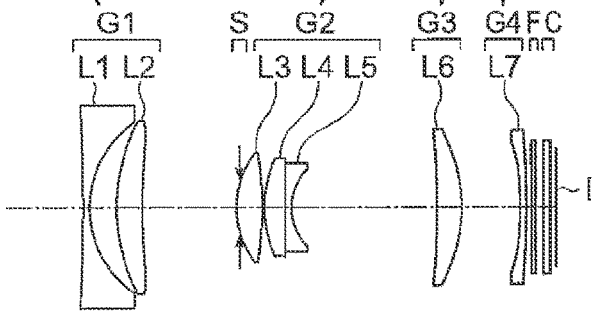
Figure 4C:
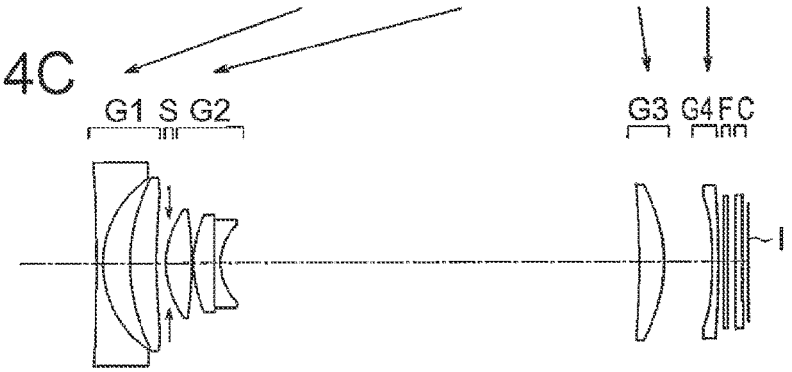

As shown in FIGS. 4A, 4B, and 4C, the zoom lens according to the fourth embodiment includes, in order from the object side, a first lens unit G1 having a negative refractive power, an aperture stop S, a second lens unit G2 having a positive refractive power, a third lens unit G3 having a positive refractive power, and a fourth lens unit G4 having a negative refractive power.

During zooming from the wide angle end to the telephoto end, the first lens unit G1 moves first toward the image side and thereafter toward the object side, the second lens unit G2 moves toward the object side, and the third lens unit G3 first moves toward the object side and thereafter toward the image side. The fourth lens unit G4 is fixed. The aperture stop S moves with the second lens unit G2.

Focusing operation is performed by moving the third lens unit G3. For focusing from an object at long distance to an object at a short distance, the third lens unit G3 is moved toward the object side.

The first lens unit G1 is composed of a biconcave negative lens L1 and a positive meniscus lens L2 having a convex surface directed toward the object side. The second lens unit G2 is composed of a biconvex positive lens L3 and a cemented lens made up of a plano-convex positive lens L4 and a plano-concave negative lens L5. The third lens unit G3 is composed of a positive meniscus lens L6 having a convex surface directed toward the image side. The fourth lens unit G4 is composed of a negative meniscus lens L7 having a convex surface directed toward to the image side. The lens elements in each lens unit are arranged in the mentioned order from the object side.

There are six aspheric surfaces, which include both surfaces of the positive meniscus lens L2 in the first lens unit G1, both surfaces of the biconvex positive lens L3 in the second lens unit G2, the image side surface of the positive meniscus lens L6 in the third lens unit G3, and the object side surface of the negative meniscus lens L7 in the fourth lens unit G4.

Figure 5A:
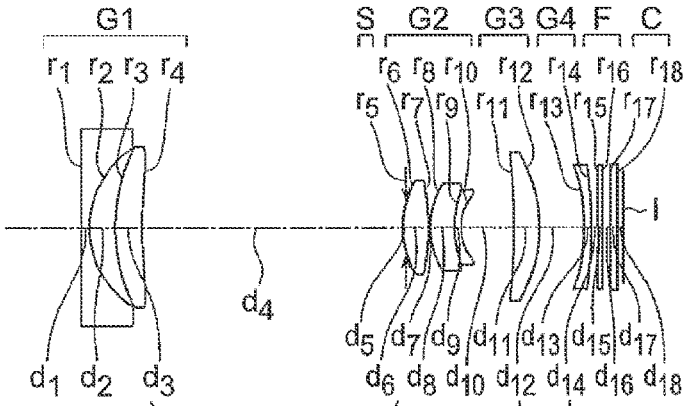
FIGS. 5A, 5B, and 5C are cross sectional views taken along the optical axis, showing the construction of a zoom lens according to a fifth embodiment of the present invention in the state in which the zoom lens is focused on an object point at infinity, where
Figure 5B:
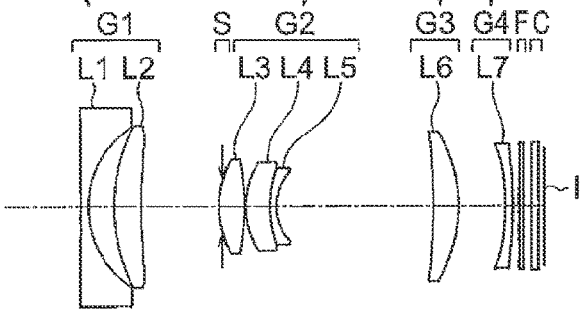
Figure 5C:
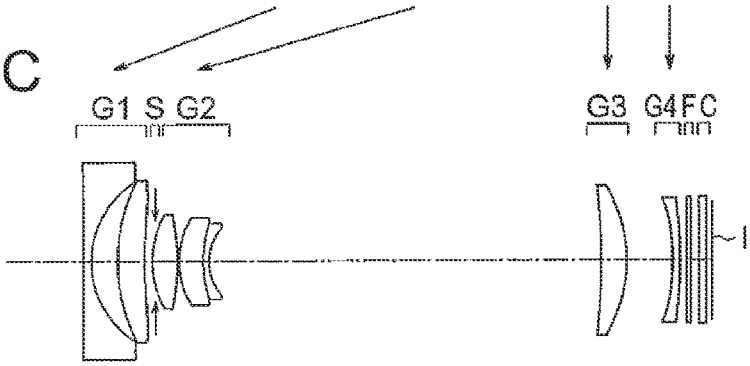
Figure 6A:
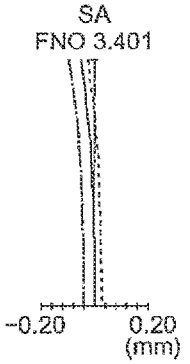
FIGS. 6A, 6B, 6C, 6D, 6E, 6F, 6G, 6H, 6I, 6J, 6K, and 6L are aberration diagrams of the zoom lens according to the first embodiment in the state in which the zoom lens is focused on an object point at infinity.
Figure 6B:
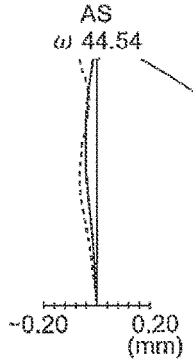
Figure 6C:
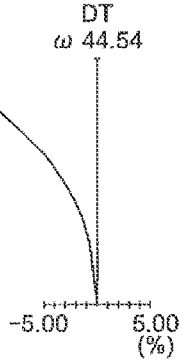
Figure 6D:
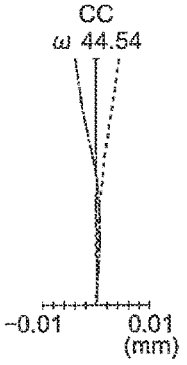
Figure 6E:
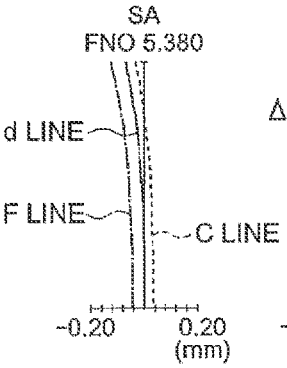
Figure 6F:
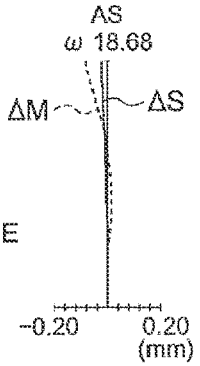
Figure 6G:
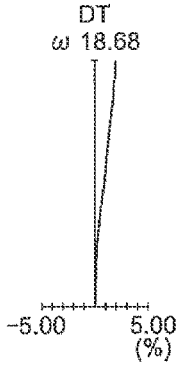
Figure 6H:
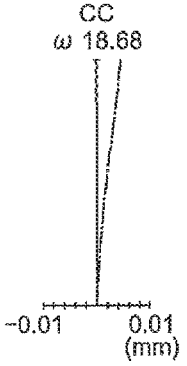
Figure 6I:
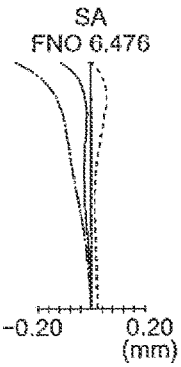
Figure 6J:
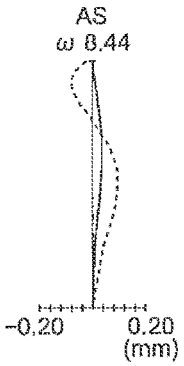
Figure 6K:
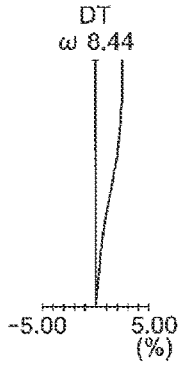
Figure 6L:
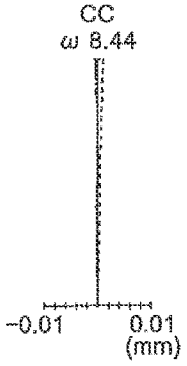
Figure 7A:
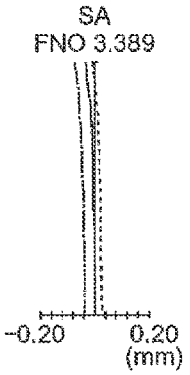
FIGS. 7A, 7B, 7C, 7D, 7E, 7F, 7G, 7H, 7I, 7J, 7K, and 7L are aberration diagrams of the zoom lens according to the second embodiment in the state in which the zoom lens is focused on an object point at infinity.
Figure 7B:
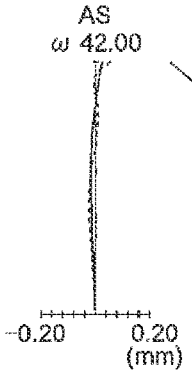
Figure 7C:
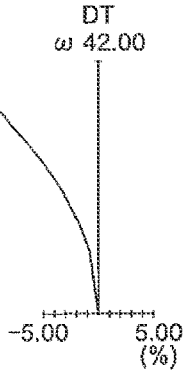
Figure 7D:
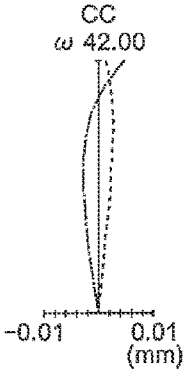
Figure 7E:
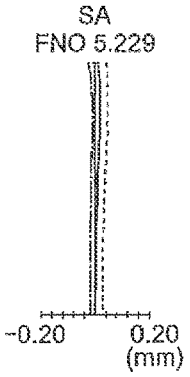
Figure 7F:
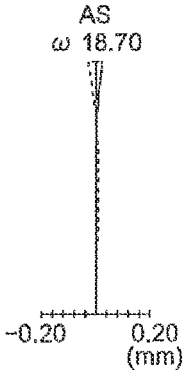
Figure 7G:
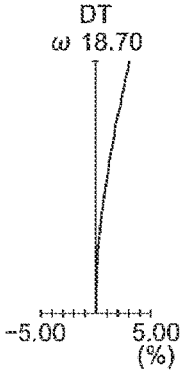
Figure 7H:
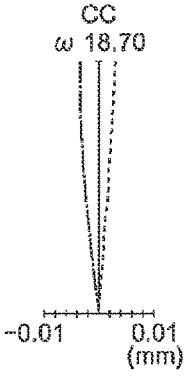
Figure 7I:
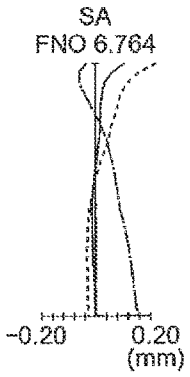
Figure 7J:
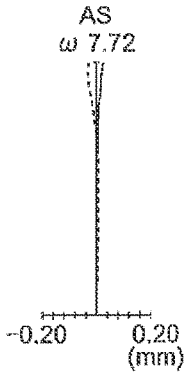
Figure 7K:
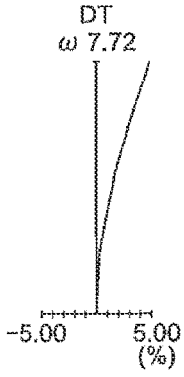
Figure 7L:
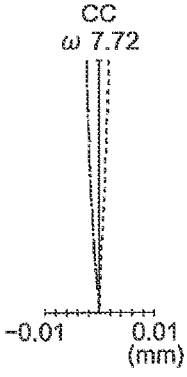
Figure 8A:
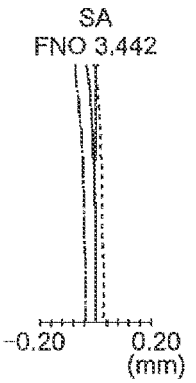
FIGS. 8A, 8B, 8C, 8D, 8E, 8F, 8G, 8H, 8I, 8J, 8K, and 8L are aberration diagrams of the zoom lens according to the third embodiment in the state in which the zoom lens is focused on an object point at infinity.
Figure 8B:
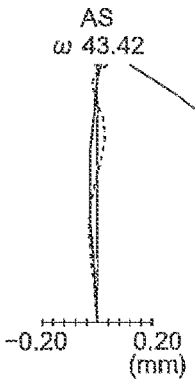
Figure 8C:
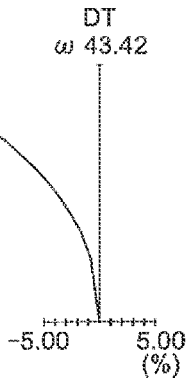
Figure 8D:
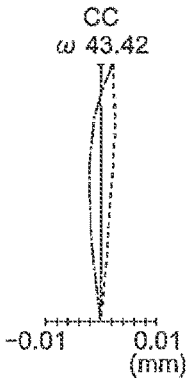
Figure 8E:
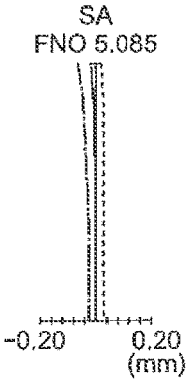
Figure 8F:
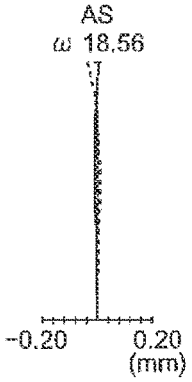
Figure 8G:
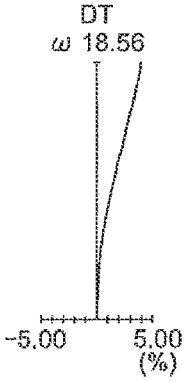
Figure 8H:
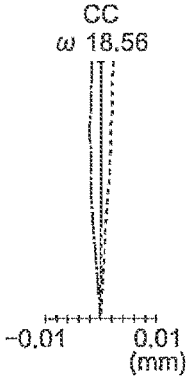
Figure 8I:
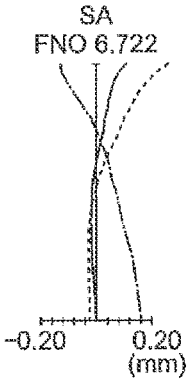
Figure 8J:
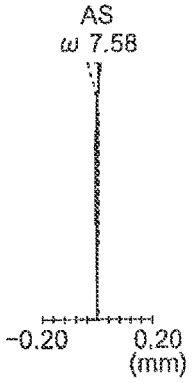
Figure 8K:
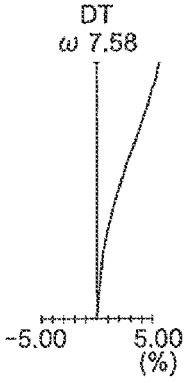
Figure 8L:
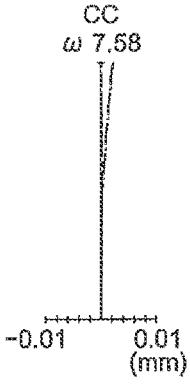
Figure 9A:
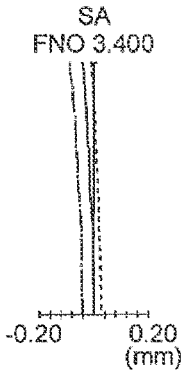
FIGS. 9A, 9B, 9C, 9D, 9E, 9F, 9G, 9H, 9I, 9J, 9K, and 9L are aberration diagrams of the zoom lens according to the fourth embodiment in the state in which the zoom lens is focused on an object point at infinity.
Figure 9B:
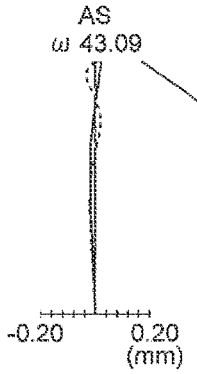
Figure 9C:
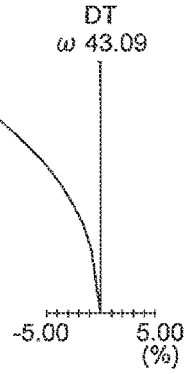
Figure 9D:
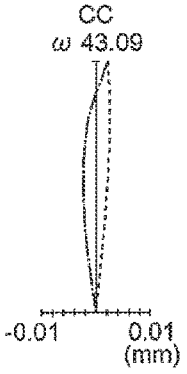
Figure 9E:
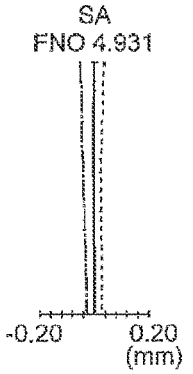
Figure 9F:
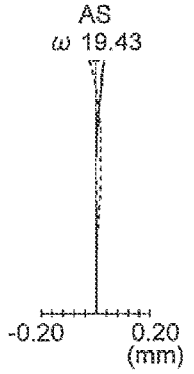
Figure 9G:
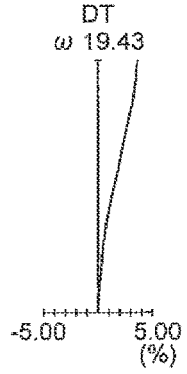
Figure 9H:
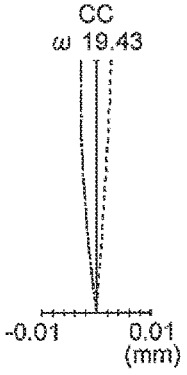
Figure 9I:
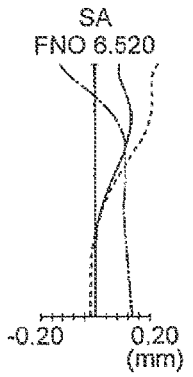
Figure 9J:
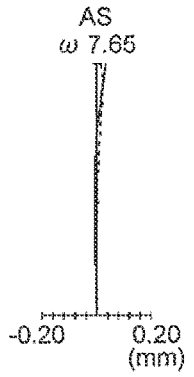
Figure 9K:
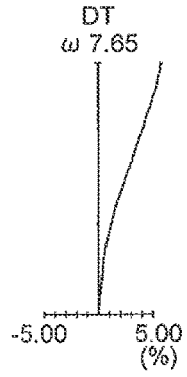
Figure 9L:
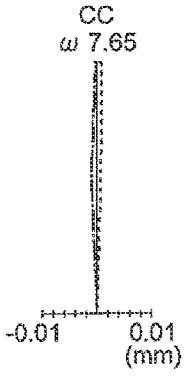
Figure 10A:
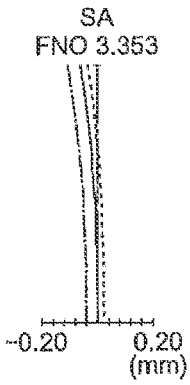
Figure 10B:
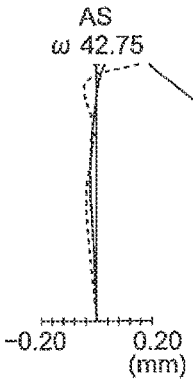
Figure 10C:
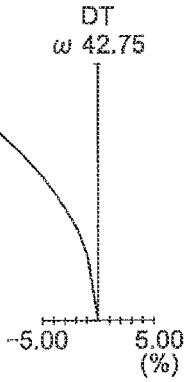
Figure 10D:
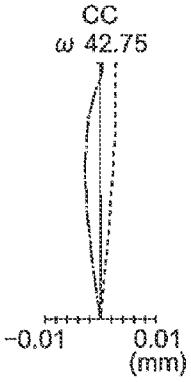
Figure 10E:
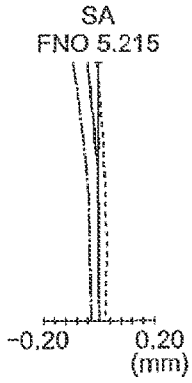
Figure 10F:
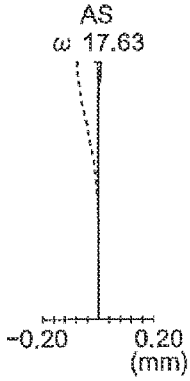
Figure 10G:
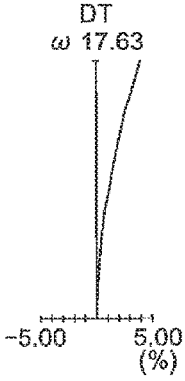
Figure 10H:
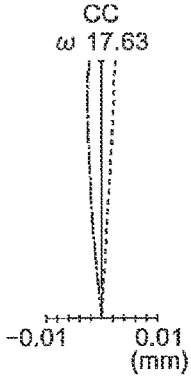
Figure 10I:
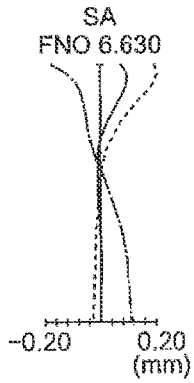
Figure 10J:
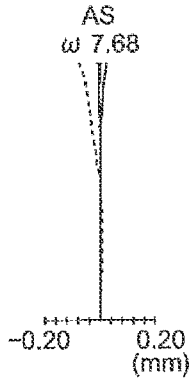
Figure 10K:
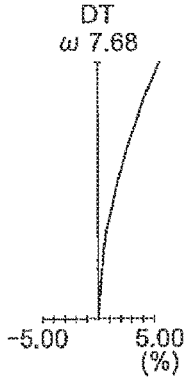
Figure 10L:
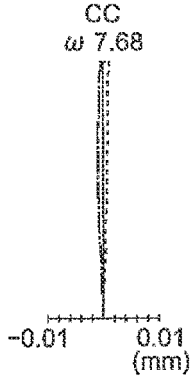

As shown in FIGS. 5A, 5B, and 5C, the zoom lens according to the fifth embodiment includes, in order from the object side, a first lens unit G1 having a negative refractive power, an aperture stop S, a second lens unit G2 having a positive refractive power, a third lens unit G3 having a positive refractive power, and a fourth lens unit G4 having a negative refractive power.

During zooming from the wide angle end to the telephoto end, the first lens unit G1 moves first toward the image side and thereafter toward the object side, the second lens unit G2 moves toward the object side, and the third lens unit G3 moves first toward the object side and thereafter toward the image side. The fourth lens unit G4 is fixed. The aperture stop S moves with the second lens unit G2.

Focusing operation is performed by moving the third lens unit G3. For focusing from an object at long distance to an object at a short distance, the third lens unit G3 is moved toward the object side.

The first lens unit G1 is composed of a biconcave negative lens L1 and a positive meniscus lens L2 having a convex surface directed toward the object side. The second lens unit G2 is composed of a biconvex positive lens L3 and a cemented lens made up of a positive meniscus lens L4 having a convex surface directed toward the object side and a negative meniscus lens L5 having a convex surface directed toward the object side. The third lens unit G3 is composed of a positive meniscus lens L6 having a convex surface directed toward the image side. The fourth lens unit G4 is composed of a negative meniscus lens L7 having a convex surface directed toward to the image side. The lens elements in each lens unit are arranged in the mentioned order from the object side.

There are six aspheric surfaces, which include both surfaces of the positive meniscus lens L2 in the first lens unit G1, both surfaces of the biconvex positive lens L3 in the second lens unit G2, the image side surface of the positive meniscus lens L6 in the third lens unit G3, and the object side surface of the negative meniscus lens L7 in the fourth lens unit G4.

Numerical data of each embodiment described above is shown below. Apart from symbols described above, fb denotes a back focus, f1, f2, . . . denotes a focal length of each lens unit, FNO denotes an F number, ω denotes a half image angle, r denotes radius of curvature of each lens surface, d denotes a distance between two lenses, nd denotes a refractive index of each lens for a d-line, and νd denotes an Abbe's number for each lens. The overall length of the lens system which will be described later is a length which is obtained by adding the back focus to a distance from the first lens surface up to the last lens surface. fb (back focus) is a unit which is expressed upon air conversion of a distance from the last lens surface up to a paraxial image plane.

A shape of the aspheric surface is described by the following expression (I) using each aspherical surface coefficient in each embodiment, when Z is let to be a coordinate point on an optical axis, and Y is let to be a coordinate point on a direction orthogonal to the optical axis.

$$Z=(Y^2/r)/[1+\{1-(1+K)(Y/r)^2\}^{1/2}]+A_4Y^4+A_6Y^6+A_8Y^8+A_{10}Y^{10} \quad (I)$$

where, r denotes a paraxial radius of curvature, K denotes a conical coefficient, $A_4$, $A_6$, $A_8$, and $A_{10}$ denote aspherical surface coefficients of a fourth order, a sixth order, an eight order, a tenth order, and a twelfth order respectively. Moreover, in the aspherical surface coefficients, 'e−n' (where, n is an integral number) indicates '$10^{-n}$'.

A flare stop may be provided in addition to the aperture stop in order to eliminate unwanted light that may cause ghost images, lens flare or the like. The flare stop may be disposed on the object side of the first lens unit, between the first lens unit and the second lens unit, between the second lens unit and the third lens unit, or between the third lens unit and the image plane. A frame member or other member may be adapted to cut rays that may cause lens flare. Alternatively, a flare stop may be provided on an optical component of the optical system by direct printing or by attaching a sticker. The aperture of the flare stop may have a circular, elliptical, rectangular, polygonal, or other shape, or the shape of the aperture may be defined by a curve expressed by a mathematical function. The flare stop may be adapted to cut not only detrimental beams but also beams that may cause coma flare etc. in the peripheral region of the image.

Anti-reflection coating may be applied on each lens to reduce ghost images and lens flare. Multi-layer coating will reduce ghost images and lens flare effectively. Anti-reflection coating is desirable in preventing ghost images and lens flare. Coating for cutting infrared light may be applied on a lens surface (s) and/or a surface (s) of the cover glass.

Anti-reflection coating on the surfaces of lenses exposed to air is widely used to prevent ghost images and lens flare. The refractive index of adhesives used on the cemented surface of cemented lenses is significantly higher than the refractive index of air. Consequently, the reflectivity of the cemented surface is as low as or lower than surfaces having single-layer coating in many cases. Therefore, anti-reflection coating is rarely applied to the cemented surface of cemented lenses. However, anti-reflection coating may be applied on the cemented surface. This will further reduce ghost images and lens flare, and better images can be obtained consequently.

Lens materials having a high refractive index that have been widely used recently are advantageous in correcting aberrations. For this reason, lens materials having a high refractive index have been frequently used in camera optical systems. However, when a lens material having a high refractive index is used as an element of a cemented lens, reflection on the cemented surface cannot be ignored. In such cases, it is particularly effective to apply anti-reflecting coating on the cemented surface.

Effective use of coating on cemented surfaces is disclosed in, for example, Japanese Patent Application Laid-Open No. 2-27301, Japanese Patent Application Laid-Open No. 2001-324676, Japanese Patent Application Laid-Open No. 2005-92115, and U.S. Pat. No. 7,116,482. The zoom lenses disclosed in these patent documents are positive-lead type zoom lenses, and these documents describe coating on cemented lens surfaces in the first lens unit. Coating may be applied to cemented lens surfaces in the second lens unit having a positive refractive power in the zoom lens according to the present invention in a manner according to the aforementioned documents. Coating material may be selected appropriately based on the refractive index of the base lens and the refractive index of the adhesive. A coating material having a relatively high refractive power such as $Ta_2O_5$, $TiO_2$, $Nb_2O_5$, $ZrO_2$, $HfO_2$, $CeO_2$, $SnO_2$, $In_2O_3$, ZnO, or $Y_2O_3$ or a coating material having a relatively low refractive power such as $MgF_2$, $SiO_2$ or $Al_2O_3$ may be selected fitly, and the coating film thickness may be set appropriately to meet the phase condition.

Coating on cemented surfaces may be multi-layer coating as with coating on lens surfaces in contact with air, as a matter of course.

By using two or more layers of coating materials in combination and selecting the each coating film thickness appropriately, the reflectance can further be reduced and spectral characteristics and angular characteristics of reflectance can be controlled.

It is effective to apply coating also to cemented surfaces in lens units other than the second lens unit for the same reason.

EXAMPLE 1

Unit mm

Surface data

| Surface no. | r | d | nd | νd |
|---|---|---|---|---|
| Object plane | ∞ | ∞ | | |
| 1* | −7122.920 | 0.72 | 1.75501 | 51.16 |
| 2* | 5.291 | 1.50 | | |
| 3* | 8.052 | 1.90 | 1.63493 | 23.90 |
| 4* | 21.294 | Variable | | |
| 5(stop) | ∞ | −0.20 | | |
| 6* | 5.461 | 1.60 | 1.58313 | 59.38 |
| 7* | −18.422 | 0.10 | | |
| 8 | 4.937 | 1.62 | 1.58313 | 59.38 |
| 9 | ∞ | 0.40 | 1.68893 | 31.07 |
| 10 | 3.025 | Variable | | |
| 11 | −135.353 | 1.71 | 1.53071 | 55.69 |
| 12* | −8.875 | Variable | | |
| 13 | ∞ | 0.30 | 1.51633 | 64.14 |
| 14 | ∞ | 0.50 | | |
| 15 | ∞ | 0.50 | 1.51633 | 64.14 |
| 16 | ∞ | 0.37 | | |
| Image plane (Image pickup surface) | ∞ | | | |

Aspherical surface data

1st surface

K = 0.000
A4 = −7.56463e−05, A6 = 1.64335e−07

2nd surface

K = −0.472
A4 = −4.34852e−04, A6 = −5.25042e−06, A8 = 4.37829e−08

3rd surface

K = 0.000
A4 = −8.08439e−04

4th surface

K = 0.000
A4 = −6.77017e−04, A6 = 9.77125e−06, A8 = −2.32429e−07

-continued

Unit mm

6th surface

K = 0.000
A4 = −5.55658e−04, A6 = −4.95073e−06, A8 = −4.37392e−07

7th surface

K = 0.714
A4 = 4.15474e−04, A6 = −4.57921e−06

12th surface

K = 0.000
A4 = 6.86055e−04, A6 = −1.83831e−05, A8 = 3.46737e−07

Zoom data

| | Wide angle | Intermediate | Telephoto |
|---|---|---|---|
| Focal length | 4.47 | 11.14 | 25.23 |
| Fno. | 3.40 | 5.38 | 6.48 |
| Angle of field 2ω | 89.08 | 37.35 | 16.89 |
| fb (in air) | 4.16 | 4.55 | 5.63 |
| Lens total length (in air) | 33.58 | 28.94 | 40.78 |
| d4 | 16.58 | 5.04 | 0.65 |
| d10 | 3.50 | 10.00 | 25.15 |
| d12 | 2.76 | 3.15 | 4.23 |

Unit focal length

| | | |
|---|---|---|
| f1 = −11.78 | f2 = 9.33 | f3 = 17.81 |

EXAMPLE 2

Unit mm

Surface data

| Surface no. | r | d | nd | νd |
|---|---|---|---|---|
| Object plane | ∞ | ∞ | | |
| 1 | −379.807 | 0.50 | 1.72916 | 54.68 |
| 2 | 6.210 | 1.86 | | |
| 3* | 12.036 | 1.87 | 1.63493 | 23.90 |
| 4* | 29.757 | Variable | | |
| 5(stop) | ∞ | −0.10 | | |
| 6* | 5.617 | 1.48 | 1.55880 | 62.55 |
| 7* | −21.002 | 0.10 | | |
| 8 | 8.506 | 1.75 | 1.80400 | 46.57 |
| 9 | −11.593 | 0.40 | 1.66680 | 33.05 |
| 10 | 3.618 | Variable | | |
| 11 | −83.333 | 1.89 | 1.53071 | 55.69 |
| 12* | −9.361 | Variable | | |
| 13* | −75.000 | 0.50 | 1.53071 | 55.69 |
| 14 | −131.563 | 0.40 | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Image pickup surface) | ∞ | | | |

Aspherical surface data

3rd surface

K = 0.000
A4 = −1.79257e−04, A6 = 1.25179e−05

4th surface

K = 0.000
A4 = −5.37200e−04, A6 = 1.54835e−05, A8 = −2.17403e−07,
A10 = −3.45431e−09

-continued

Unit mm

6th surface

K = 0.000
A4 = −7.19399e−04, A6 = −3.58883e−05, A8 = 2.19726e−06
7th surface

K = 0.000
A4 = 4.15763e−04, A6 = −3.74428e−05, A8 = 3.19290e−06
12th surface

K = 0.000
A4 = 3.65546e−04, A6 = −6.06579e−06, A8 = 1.00058e−07
13th surface

K = 0.000
A4 = −7.96839e−04

Zoom data

| | Wide angle | Intermediate | Telephoto |
|---|---|---|---|
| Focal length | 4.73 | 11.00 | 26.99 |
| Fno. | 3.39 | 5.23 | 6.76 |
| Angle of field 2ω | 84.00 | 37.41 | 15.44 |
| fb (in air) | 1.81 | 1.78 | 1.81 |
| Lens total length (in air) | 35.29 | 31.44 | 43.87 |
| d4 | 16.56 | 5.70 | 0.60 |
| d10 | 3.50 | 10.91 | 28.41 |
| d12 | 3.16 | 2.80 | 2.80 |

Unit focal length

| | | | |
|---|---|---|---|
| f1 = −12.15 | f2 = 10.17 | f3 = 19.70 | f4 = −329.71 |

EXAMPLE 3

Unit mm

Surface data

| Surface no. | r | d | nd | νd |
|---|---|---|---|---|
| Object plane | ∞ | ∞ | | |
| 1 | −191.555 | 0.50 | 1.72916 | 54.68 |
| 2 | 6.438 | 1.77 | | |
| 3* | 10.607 | 1.71 | 1.63493 | 23.90 |
| 4* | 21.971 | Variable | | |
| 5(stop) | ∞ | −0.20 | | |
| 6* | 5.593 | 1.63 | 1.58313 | 59.38 |
| 7* | −18.379 | 0.10 | | |
| 8 | 6.991 | 1.26 | 1.80610 | 40.92 |
| 9 | 63.116 | 0.56 | 1.74077 | 27.79 |
| 10 | 3.586 | Variable | | |
| 11 | −55.556 | 1.65 | 1.53071 | 55.69 |
| 12* | −10.515 | Variable | | |
| 13* | −75.000 | 0.40 | 1.53071 | 55.69 |
| 14 | −31.555 | 0.20 | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Image pickup surface) | ∞ | | | |

Aspherical surface data

3rd surface

K = 0.000
A4 = −1.14398e−04, A6 = 2.14045e−06

-continued

Unit mm

4th surface

K = 0.000
A4 = −4.15289e−04, A6 = 7.39897e−06, A8 = −2.62628e−07
6th surface

K = 0.000
A4 = −8.06031e−04, A6 = −1.73341e−05, A8 = 3.11630e−07,
A10 = −3.92018e−08
7th surface K = 0.000
A4 = 1.80835e−04, A6 = −1.02940e−05, A8 = 3.02081e−07
12th surface K = 0.000
A4 = 1.30588e−04
13th surface K = 0.000
A4 = −1.79123e−03, A6 = 3.08236e−05

Zoom data

| | Wide angle | Intermediate | Telephoto |
|---|---|---|---|
| Focal length | 4.72 | 11.00 | 27.31 |
| Fno. | 3.44 | 5.08 | 6.72 |
| Angle of field 2ω | 86.83 | 37.11 | 15.15 |
| fb (in air) | 1.60 | 1.60 | 1.60 |
| Lens total length (in air) | 35.51 | 29.77 | 41.44 |
| d4 | 17.52 | 5.41 | 0.70 |
| d10 | 3.80 | 9.16 | 26.90 |
| d12 | 3.22 | 4.23 | 2.87 |

Unit focal length

| | | | |
|---|---|---|---|
| f1 = −12.33 | f2 = 9.92 | f3 = 24.13 | f4 = 102.32 |

EXAMPLE 4

Unit mm

Surface data

| Surface no. | r | d | nd | νd |
|---|---|---|---|---|
| Object plane | ∞ | ∞ | | |
| 1 | −107.388 | 0.40 | 1.72916 | 54.68 |
| 2 | 6.785 | 1.78 | | |
| 3* | 11.904 | 1.69 | 1.63493 | 23.90 |
| 4* | 27.575 | Variable | | |
| 5(stop) | ∞ | −0.20 | | |
| 6* | 5.467 | 1.71 | 1.58313 | 59.38 |
| 7* | −20.023 | 0.12 | | |
| 8 | 7.621 | 1.35 | 1.77250 | 49.60 |
| 9 | ∞ | 0.40 | 1.68893 | 31.07 |
| 10 | 3.618 | Variable | | |
| 11 | −55.556 | 1.60 | 1.53071 | 55.69 |
| 12* | −9.756 | Variable | | |
| 13* | −56.000 | 0.40 | 1.53071 | 55.69 |
| 14 | −57.650 | 0.30 | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Image pickup surface) | ∞ | | | |

-continued

Unit mm

Aspherical surface data

3rd surface

K = 0.000
A4 = −1.10813e−04, A6 = 1.52043e−06
4th surface

K = 0.000
A4 = −3.75650e−04, A6 = 1.62042e−06, A8 = −1.43158e−08,
A10 = −2.87193e−09
6th surface K = 0.000
A4 = −6.66112e−04, A6 = −2.17841e−05, A8 = 9.34287e−07,
A10 = −7.54418e−08
7th surface K = 0.000
A4 = 3.58972e−04, A6 = −8.61359e−06
12th surface K = 0.000
A4 = 1.07879e−04, A6 = 2.97445e−06
13th surface K = 0.000
A4 = −2.10229e−03, A6 = 4.77762e−05

Zoom data

| | Wide angle | Intermediate | Telephoto |
|---|---|---|---|
| Focal length | 4.70 | 10.51 | 27.01 |
| Fno. | 3.40 | 4.93 | 6.52 |
| Angle of field 2ω | 86.19 | 38.86 | 15.30 |
| fb (in air) | 1.70 | 1.70 | 1.70 |
| Lens total length (in air) | 36.57 | 30.55 | 42.23 |
| d4 | 18.47 | 6.37 | 0.81 |
| d10 | 3.84 | 9.46 | 27.33 |
| d12 | 3.31 | 3.77 | 3.13 |

Unit focal length f1 = −12.64 f2 = 10.30 f3 = 22.03 f4 = −4025.08

EXAMPLE 5

Unit mm

Surface data

| Surface no. | r | d | nd | νd |
|---|---|---|---|---|
| Object plane | ∞ | ∞ | | |
| 1 | −547.225 | 0.50 | 1.72916 | 54.68 |
| 2 | 6.219 | 1.71 | | |
| 3* | 10.994 | 1.76 | 1.63493 | 23.90 |
| 4* | 24.135 | Variable | | |
| 5(stop) | ∞ | −0.20 | | |
| 6* | 6.000 | 1.65 | 1.49700 | 81.54 |
| 7* | −14.535 | 0.10 | | |
| 8 | 5.413 | 1.60 | 1.78800 | 47.37 |
| 9 | 7.800 | 0.40 | 1.75520 | 27.51 |
| 10 | 3.387 | Variable | | |
| 11 | −40.000 | 1.65 | 1.53071 | 55.69 |
| 12* | −8.984 | Variable | | |
| 13* | −19.817 | 0.50 | 1.53071 | 55.69 |
| 14 | −29.798 | 0.14 | | |
| 15 | ∞ | 0.30 | 1.51633 | 64.14 |
| 16 | ∞ | 0.50 | | |
| 17 | ∞ | 0.50 | 1.51633 | 64.14 |
| 18 | ∞ | 0.37 | | |
| Image plane (Image pickup surface) | ∞ | | | |

-continued

Unit mm

Aspherical surface data

3rd surface

K = 0.000
A4 = −1.92015e−04, A6 = 3.37772e−06
4th surface

K = 0.000
A4 = −5.17380e−04, A6 = 5.11454e−06, A8 = −1.01709e−07,
A10 = −4.69600e−09
6th surface K = 0.000
A4 = −5.56054e−04, A6 = −5.33760e−06, A8 = −4.84775e−07,
A10 = 6.77704e−08
7th surface K = 0.000
A4 = 3.32234e−04, A6 = −1.01751e−05, A8 = 1.06894e−06
12th surface K = 0.000
A4 = 3.75540e−04, A6 = −1.58426e−05, A8 = 7.09724e−07,
A10 = −1.38408e−08
13th surface K = 0.000
A4 = −9.39351e−04

Zoom data

| | Wide angle | Intermediate | Telephoto |
|---|---|---|---|
| Focal length | 4.73 | 11.62 | 26.98 |
| Fno. | 3.35 | 5.21 | 6.63 |
| Angle of field 2ω | 85.50 | 35.27 | 15.35 |
| fb (in air) | 1.80 | 1.80 | 1.80 |
| Lens total length (in air) | 35.16 | 30.04 | 40.85 |
| d4 | 17.30 | 5.31 | 0.70 |
| d10 | 3.50 | 10.23 | 25.69 |
| d12 | 2.89 | 3.04 | 3.00 |

Unit focal length f1 = −12.17 f2 = 9.74 f3 = 21.44 f4 = −113.45

FIGS. 6A to 6L, 7A to 7L, 8A to 8L, 9A to 9L, and 10A to 10L are aberration diagrams of the zoom lenses according to the first to fifth embodiments described in the foregoing in the state in which the zoom lenses are focused on an object point at infinity. In the aberration diagrams, ω represents the half angle of view.

FIGS. 6A to 6L are aberration diagrams of the zoom lens according to the first embodiment in the state in which the zoom lens is focused on an object point at infinity. FIGS. 6A, 6B, 6C, and 6D respectively show spherical aberration (SA), astigmatism (AS), distortion (DT), and chromatic aberration of magnification (CC) of the zoom lens at the wide angle end. FIGS. 6E, 6F, 6G, and 6H respectively show spherical aberration, astigmatism, distortion, and chromatic aberration of magnification of the zoom lens in the intermediate focal length state. FIGS. 6I, 6J, 6K, and 6L respectively show spherical aberration, astigmatism, distortion, and chromatic aberration of magnification of the zoom lens at the telephoto end.

FIGS. 7A to 7L are aberration diagrams of the zoom lens according to the second embodiment in the state in which the zoom lens is focused on an object point at infinity. FIGS. 7A, 7B, 7C, and 7D respectively show spherical aberration (SA), astigmatism (AS), distortion (DT), and chromatic aberration of magnification (CC) of the zoom lens at the wide angle end. FIGS. 7E, 7F, 7G, and 7H respectively show spherical aberration, astigmatism, distortion, and chromatic aberration of magnification of the zoom lens in the intermediate focal length state. FIGS. 7I, 7J, 7K, and 7L respectively show spherical aberration, astigmatism, distortion, and chromatic aberration of magnification of the zoom lens at the telephoto end.

FIGS. 8A to 8L are aberration diagrams of the zoom lens according to the third embodiment in the state in which the zoom lens is focused on an object point at infinity. FIGS. 8A, 8B, 8C, and 8D respectively show spherical aberration (SA), astigmatism (AS), distortion (DT), and chromatic aberration of magnification (CC) of the zoom lens at the wide angle end. FIGS. 8E, 8F, 8G, and 8H respectively show spherical aberration, astigmatism, distortion, and chromatic aberration of magnification of the zoom lens in the intermediate focal length state. FIGS. 8I, 8J, 8K, and 8L respectively show spherical aberration, astigmatism, distortion, and chromatic aberration of magnification of the zoom lens at the telephoto end.

FIGS. 9A to 9L are aberration diagrams of the zoom lens according to the fourth embodiment in the state in which the zoom lens is focused on an object point at infinity. FIGS. 9A, 9B, 9C, and 9D respectively show spherical aberration (SA), astigmatism (AS), distortion (DT), and chromatic aberration of magnification (CC) of the zoom lens at the wide angle end. FIGS. 9E, 9F, 9G, and 9H respectively show spherical aberration, astigmatism, distortion, and chromatic aberration of magnification of the zoom lens in the intermediate focal length state. FIGS. 9I, 9J, 9K, and 9L respectively show spherical aberration, astigmatism, distortion, and chromatic aberration of magnification of the zoom lens at the telephoto end.

FIGS. 10A to 10L are aberration diagrams of the zoom lens according to the fifth embodiment in the state in which the zoom lens is focused on an object point at infinity. FIGS. 10A, 10B, 10C, and 10D respectively show spherical aberration (SA), astigmatism (AS), distortion (DT), and chromatic aberration of magnification (CC) of the zoom lens at the wide angle end. FIGS. 10E, 10F, 10G, and 10H respectively show spherical aberration, astigmatism, distortion, and chromatic aberration of magnification of the zoom lens in the intermediate focal length state. FIGS. 10I, 10J, 10K, and 10L respectively show spherical aberration, astigmatism, distortion, and chromatic aberration of magnification of the zoom lens at the telephoto end.

Next, parameter and values of conditional expressions in each embodiments are described.

| Conditional expressions | Example 1 | Example 2 | Example 3 |
|---|---|---|---|
| (1) $\Sigma d_{13}/f_t$ | 0.37 | 0.36 | 0.34 |
| (2) $\Sigma d/f_t$ | — | 0.38 | 0.35 |
| (3) $f_1/f_w$ | −2.63 | −2.57 | −2.61 |
| (4) $\lvert m_{2G}\rvert/f_w$ | 4.93 | 5.19 | 4.82 |
| (5) $n_{1nd}$ | 1.76 | 1.73 | 1.73 |
| (6) $v_{1nd}$ | 51 | 55 | 55 |
| (7) $n_{1pd}$ | 1.63 | 1.63 | 1.63 |
| (8) $v_{1pd}$ | 24 | 24 | 24 |
| (3a) $f_1/f_w$ | −2.63 | −2.57 | −2.61 |
| (9) $f_2/f_w$ | 2.08 | 2.15 | 2.10 |
| (10) $f_3/f_w$ | 3.98 | 4.16 | 5.11 |
| (11) $d_{1m}/I_h$ | 0.19 | 0.13 | 0.13 |
| (12) $f_t/f_w$ | 5.64 | 5.71 | 5.79 |

-continued

| Conditional expressions | Example 4 | Example 5 |
|---|---|---|
| (1) $\Sigma d_{13}/f_t$ | 0.33 | 0.35 |
| (2) $\Sigma d/f_t$ | 0.35 | 0.37 |
| (3) $f_1/f_w$ | −2.69 | −2.57 |
| (4) $\lvert m_{2G}\rvert/f_w$ | 4.95 | 4.71 |
| (5) $n_{1nd}$ | 1.73 | 1.73 |
| (6) $v_{1nd}$ | 55 | 55 |
| (7) $n_{1pd}$ | 1.63 | 1.63 |
| (8) $v_{1pd}$ | 24 | 24 |
| (3a) $f_1/f_w$ | −2.69 | −2.57 |
| (9) $f_2/f_w$ | 2.19 | 2.06 |
| (10) $f_3/f_w$ | 4.69 | 4.53 |
| (11) $d_{1m}/I_h$ | 0.10 | 0.13 |
| (12) $f_t/f_w$ | 5.75 | 5.70 |

(Correction of Distortion)

Incidentally, when the zoom lens system of the present invention is used, a digital correction of distortion of an image is carried out electrically. A basic concept for the digital correction of the distortion of an image will be described below.

Figure 11:
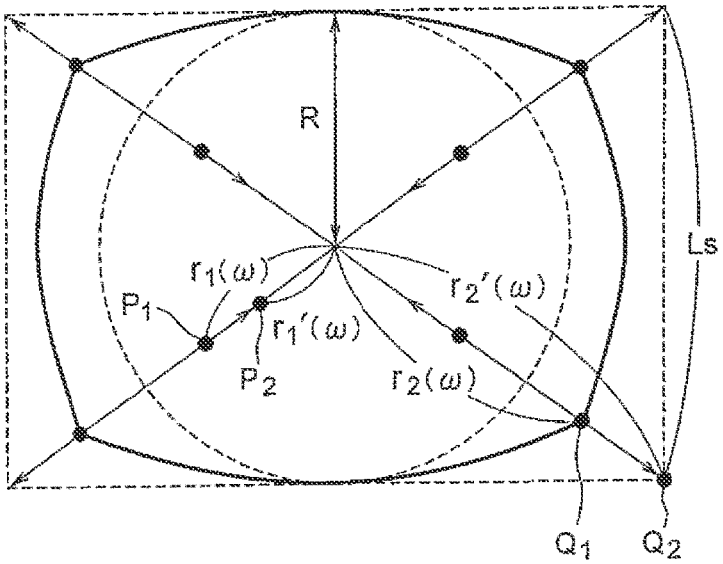
FIG. 11 is a diagram illustrating correction of distortion.

For example, as shown in FIG. 11, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, distortion of an image is corrected by moving each point on a circumference (image height) of an arbitrary radius r (ω) other than the radius R in a substantial direction of radiation. In concrete terms, the correction is carried out by moving the point on the circumference on a concentric circle such that the arbitrary radius r(ω) becomes r'(ω).

For example, in FIG. 11, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega)=\alpha\cdot f\cdot\tan\omega$$

where, ω is a half image angle of an object, f is a focal length of an imaging optical system (the zoom lens system in the present invention), and α is not less than 0 and not more than 1.

Here, when an ideal image height corresponding to a circle (image height) of radius R is let to be Y, then $$\alpha=R/Y=R/(f\cdot\tan\omega).$$

The optical system, ideally, is rotationally symmetric with respect to an optical axis. Accordingly, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius $r(\omega)$ other than the radius R in a substantial direction of radiation, and moving on a concentric circle such that the radius becomes $r'(\omega)$, it can be considered to be advantageous from a point of amount of data and amount of calculation.

Incidentally, an optical image ceases to be a continuous amount at a point of time when an image is picked up by an electronic image pickup element (due to sampling).

Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, such method is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement may be made such that a relationship between $r(\omega)$, in other words, half image angle and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6Ls$$

where, Ls is a length of a short side of the effective image pickup surface.

It is preferable that the radius R satisfies the following conditional expression.

$$0.3\ Ls \leq R \leq 0.6\ Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega)=\alpha \cdot f \cdot \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega)=\alpha \cdot f \cdot \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f=y/\tan \omega$$

holds.

Here, y denotes a height (image height) of an image point from the optical axis, f denotes a focal length of an imaging system (zoom lens system in the present invention), and $\omega$ denotes an angle (object half image angle) with respect to the optical axis in an object point direction corresponding to image points connecting from a center on an image pickup plane up to a position of y.

When there is a barrel-shape distortion in the imaging optical system, the relationship becomes $$f>y/\tan \omega.$$

In other words, when the focal length f of the imaging optical system, and the image height y are let to be fixed, a value of $\omega$ becomes large.

Figure 12:
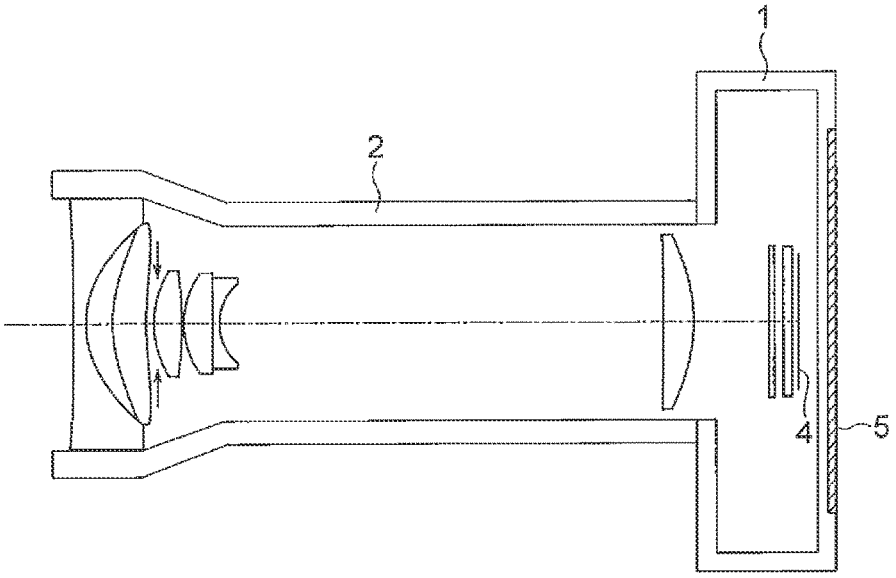
FIG. 12 is a cross sectional view of a compact camera as an image pickup apparatus equipped with a zoom lens according to the present invention and an image pickup element such as a CCD or CMOS sensor.

FIG. 12 is a cross-sectional view of a compact camera 1 as an image pickup apparatus in which, the zoom lens according to the present invention is used, and a small-size CCD (charge coupled device) or a CMOS (complementary metal oxide semiconductor) is used. An image pickup lens system 2 is disposed inside a lens barrel of the compact camera 1, and an image pickup element surface 4, and a back monitor 5 are disposed inside a (camera) body.

Here, it is also possible to let the image pickup lens system 2 to be detachable from a single-lens mirrorless camera by providing a mounting portion to the lens barrel. As the mounting portion, for example, a screw type mount or a bayonet type mount could be used.

The zoom lens described in the embodiments from the first embodiment to the fifth embodiment is to be used as the image pickup lens system 2 of the compact camera 1 having such structure.

Figure 13:
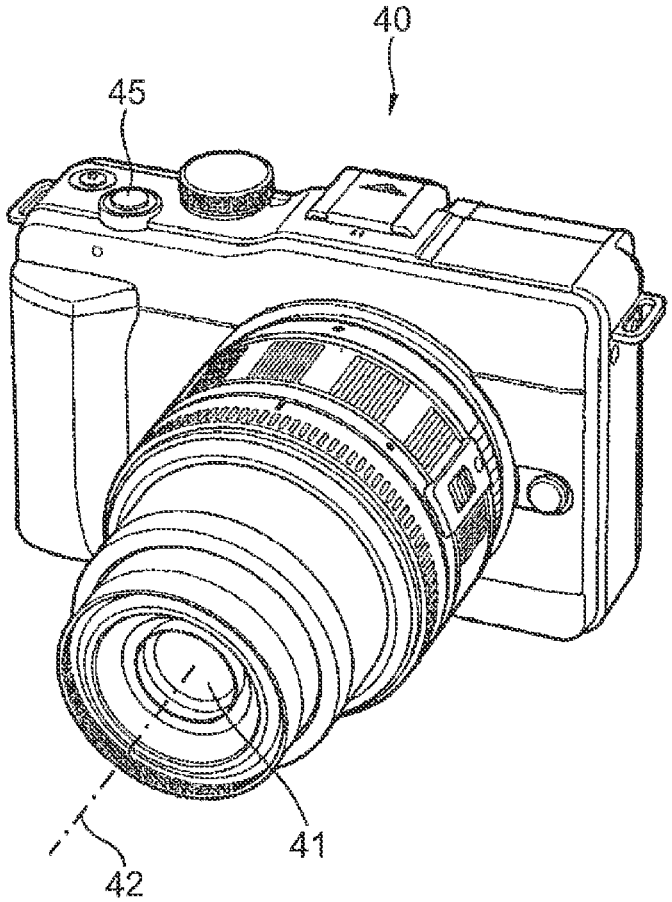
FIG. 13 is a front perspective view showing the outer appearance of a digital camera as an image pickup apparatus.
Figure 14:
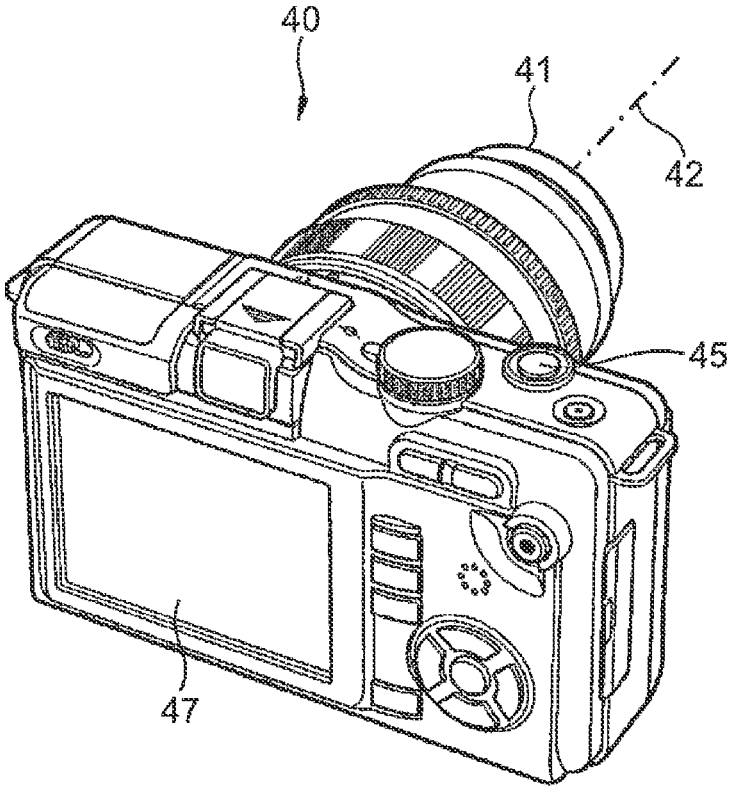
FIG. 14 is a rear perspective view showing the outer appearance of the digital camera as an image pickup apparatus.

FIG. 13 and FIG. 14 show conceptual diagrams of a structure of the image pickup apparatus according to the present invention in which, the zoom lens has been incorporated in a photographic optical system 41. FIG. 13 is a front perspective view showing an appearance of a digital camera 40 as an image pickup apparatus, and FIG. 14 is a rear perspective view showing an appearance of the digital camera 40.

The digital camera 40 according to the embodiment includes the photographic optical system 41 positioned on a capturing optical path 42, a shutter button 45, and a liquid-crystal display monitor 47. When the shutter button 45 disposed on an upper portion of the digital camera 40 is pressed, in conjunction with the pressing of the shutter button 45, an image is captured through the photographic optical system 41 such as the zoom lens according to the first embodiment. An object image which has been formed by the photographic optical system 41 is formed on an image pickup element (photoelectric conversion surface) provided near an image forming surface. The object image which has been received by the image pickup element is displayed as an electronic image on the liquid-crystal display monitor 47 provided on a rear surface of the digital camera 40 by a processing unit. Moreover, it is possible to record the electronic image which has been captured in a recording unit.

(Internal Circuit Structure)

Figure 15:
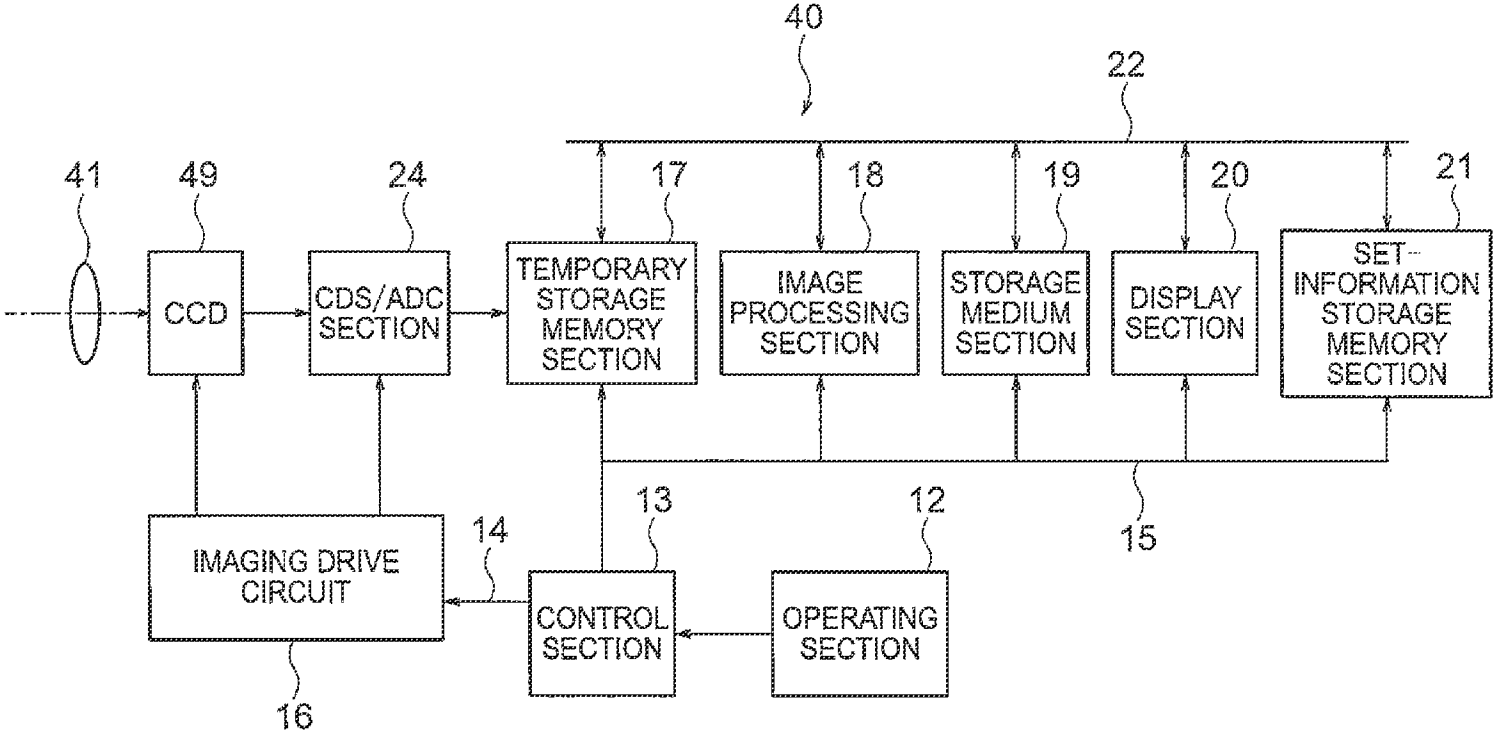
FIG. 15 is a block diagram of a relevant internal circuit of the digital camera.

FIG. 15 is a block diagram showing an internal circuit of main components of the digital camera 40. In the following description, the processing unit mentioned above includes components such as CDS/ADC section 24, a temporary storage memory section 17, and an image processing section 18. A storage unit includes a storage medium As shown in FIG. 15, the digital camera 40 includes an operating section 12, a control section 13 which is connected to the operating section 12, an imaging drive circuit 16 which is connected to a control-signal output port of the control section 13 via buses 14 and 15, the temporary storage memory section 17, the image processing section 18, a storage medium section 19, a display section 20, and a set-information storage memory section 21.

The temporary storage memory section 17, the image processing section 18, the storage medium section 19, the display section 20, and the set-information storage memory section 21 are capable of inputting and outputting data mutually via a bus 22. Moreover, a CCD 49 and the CDS/ADC section 24 are connected to the imaging drive circuit 16.

The operating section 12 includes various input buttons and switches, and imparts event information input from outside (user of camera) via the input buttons and switches to the control section 13. The control section 13 is a central arithmetic processing unit such as a CPU with a built-in program memory which is not shown in the diagram, and controls the overall digital camera according to a computer program which has been stored in the computer program memory.

The CCD 49 is an image pickup element which is driven and controlled by the imaging drive circuit 16, and which converts an amount of light for each pixel of the object image which has been formed through the image pickup optical system 41 to an electric signal, and outputs to the CDS/ADC section 24.

The CDS/ADC section 24 is a circuit which amplifies the electric signal input from the CCD 49, and also carries out analog-to-digital conversion, and outputs image raw-data only for the amplification and digital conversion carried out (bayer data, hereinafter called as 'RAW data').

The temporary storage memory section 17 is a buffer such as a SDRAM, and is a memory unit which temporarily stores the RAW data output put from the CDS/ADC section 24. The image processing section 18 is a circuit which reads the RAW data which has been stored in the temporary storage memory section 17 or the RAW data which has been stored in the storage medium section 19, and carries out electrically, various image processing including a distortion correction based on image-quality parameters which have been specified by the control section 13.

The recording medium section 19 in which, a recording medium in the form of a stick or a card with a flash memory is detachably mounted, records and maintains the RAW data which is transferred from the temporary storage memory section 17 and image data which has been subjected to image processing in the image processing section 18.

The display section 20 includes the liquid-crystal display monitor 47 and displays operation menu, image data, and RAW data captured. The set-information storage memory section 21 is provided with a ROM section in which various image-quality parameters are stored in advance, and a RAM section which stores the image-quality parameters which have been read from the ROM section by an input and output operation of the operating section 12.

The digital camera 40 which is structured in such manner, by adopting the zoom lens according to the present invention as the photographic optical system 41, enables zooming, and enables setting of a first mode which enables focusing including up to infinity and a second mode in which it is possible to achieve substantial (high) magnification, thereby making it possible to let to be an image pickup apparatus which is advantageous for both small-sizing and improved performance.

As described above, the zoom lens according to the present invention is useful when excellent optical performance and size reduction are to be achieved while achieving a high zoom ratio.

The present invention can provide a wide-angle, high-zoom ratio, compact zoom lens composed of a reduced number of lenses at low cost while achieving excellent aberration characteristics, in particular excellent chromatic aberration characteristics. The present invention can also provide an image pickup apparatus equipped with such a zoom lens.

What is claimed is:

1. A zoom lens comprising, in order from the object side:

a first lens unit having a negative refractive power;

a second lens unit having a positive refractive power; and a third lens unit having a positive refractive power, wherein the first lens unit comprises a negative lens and a positive lens, [and]

*the negative lens in the first lens unit is a biconcave lens, the first lens unit and the second lens unit move in such a way as to vary the distance between the first lens unit and the second lens unit, and* the zoom lens satisfies the following conditional [expression] *expressions* (1), (*4*) *and* (*11*):

$$\Sigma d_{13}/f_t < [0.4]\ 0.37 \quad (1)$$

$$|m_{2G}|/f_w > 4.6 \quad (4), \text{ and}$$

$$d_{1m}/I_h < 0.2 \quad (11)$$

where $\Sigma d_{13}$ is the total sum of the thickness of the lenses included in the first to third lens units of the zoom lens on the optical axis, [and] $f_t$ is the focal length of the entire zoom lens system at the telephoto end, $f_w$ *is the focal length of the entire zoom lens system at the wide angle end,* $m_{2G}$ *is the amount of shift of the second lens*

*unit on the optical axis during zooming from the wide angle end to the telephoto end, and $d_{1m}$ is the thickness of the negative lens in the first lens unit on the optical axis, and $I_h$ is the largest image height of the zoom lens on an image pickup surface of the zoom lens.*

2. The zoom lens according to claim 1, wherein the zoom lens satisfies the following conditional expression (2):

$$\Sigma d/f_t<0.45 \quad (2)$$

where Σd is the total sum of the thickness of all the lenses included in the zoom lens on the optical axis.

3. The zoom lens according to claim 1, wherein the first lens unit and the second lens unit move in such a way as to vary the relative distance between the first lens unit and the second lens unit during zooming and the zoom lens satisfies the following conditional [expressions] *expression* (3) [and (4)]:

$$f_1/f_w<-2.5 \quad (3), \text{ [and}$$

$$|m_{2G}|/f_w>4.6 \quad (4),\text{]}$$

where $f_1$ is the focal length of the first lens unit, *and*

$f_w$ is the focal length of the entire zoom lens system at the wide angle end[, and $m_{2G}$ is the amount of shift of the second lens unit on the optical axis during zooming from the wide angle end to the telephoto end].

4. The zoom lens according to claim 1, wherein the zoom lens satisfies the following conditional expressions (5), (6), (7), and (8):

$$1.70<n_{1nd}<1.80 \quad (5)$$

$$50<\nu_{1nd}<60 \quad (6)$$

$$1.60<n_{1pd}<1.70 \quad (7), \text{ and}$$

$$20<\nu_{1pd}<30 \quad (8),$$

where $n_{1nd}$ is the refractive index of the negative lens in the first lens unit with respect to the d-line, $\nu_{1nd}$ is the Abbe constant $(n_{1nd}-1)/(n_{F1}-n_{C1})$ of the negative lens in the first lens unit with respect to the d-line, $n_{C1}$ is the refractive index of the negative lens in the first lens unit with respect to the C-line, $n_{F1}$ is the refractive index of the negative lens in the first lens unit with respect to the F-line, $n_{1pd}$ is the refractive index of the positive lens in the first lens unit with respect to the d-line, $\nu_{1pd}$ is the Abbe constant $(n_{1pd}-1)/(n_{F2}-n_{C2})$ of the positive lens in the first lens unit with respect to the d-line, $n_{c2}$ is the refractive index of the positive lens in the first lens unit with respect to the C-line, and $n_{F2}$ is the refractive index of the positive lens in the first lens unit with respect to the F-line.

5. The zoom lens according to claim 1, wherein the zoom lens satisfies the following conditional expressions (3a), (9), and (10):

$$-3.0<f_1/f_w<-2.5 \quad (3a),$$

$$2.05<f_2/f_w<2.20 \quad (9), \textit{ and}$$

$$3.9<f_3/f_w<5.2 \quad (10),$$

where $f_1$ is the focal length of the first lens unit, $f_2$ is the focal length of the second lens unit, *and* $f_3$ is the focal length of the third lens unit[, and $f_w$ is the focal length of the entire zoom lens system at the wide angle end].

[6. The zoom lens according to claim 1, wherein the negative lens in the first lens unit is a biconcave lens, the first lens unit and the second lens unit move in such a way as to vary the distance between the first lens unit and the second lens unit, and the following conditional expression (11) is satisfied:

$$d_{1m}/I_h<0.2 \quad (11),$$

where $d_{1m}$ is the thickness of the negative lens in the first lens unit on the optical axis, and $I_h$ is the largest image height of the zoom lens on an image pickup surface of the zoom lens.]

7. The zoom lens according to claim 1, wherein the zoom lens satisfies the following conditional expression (12):

$$f_t/f_w>4.5 \quad (12)\text{[,}$$

where $f_w$ is the focal length of the entire zoom lens system at the wide angle end].

8. The image pickup apparatus comprising:

a zoom lens according to claim 1; and an image pickup element disposed on the image side of the zoom lens and having an image pickup surface that receives an image formed by the zoom lens.

* * * * *